(12) United States Patent
Wieczorek

(10) Patent No.: US 11,733,515 B2
(45) Date of Patent: *Aug. 22, 2023

(54) SYSTEM AND METHOD FOR DISTANCED INTERACTIVE EXPERIENCES

(71) Applicant: Mark D. Wieczorek, San Diego, CA (US)

(72) Inventor: Mark D. Wieczorek, San Diego, CA (US)

(*) Notice: Subject to any disclaimer, the term of this patent is extended or adjusted under 35 U.S.C. 154(b) by 15 days.

This patent is subject to a terminal disclaimer.

(21) Appl. No.: 17/507,945

(22) Filed: Oct. 22, 2021

(65) Prior Publication Data

US 2022/0043263 A1    Feb. 10, 2022

Related U.S. Application Data

(63) Continuation-in-part of application No. 17/389,798, filed on Jul. 30, 2021, now Pat. No. 11,609,426, which is a continuation of application No. 17/148,095, filed on Jan. 13, 2021, now Pat. No. 11,137,601, said application No. 17/096,460 is a continuation of application No. 17/094,428, filed on Nov. 10, 2020, now Pat. No. 10,921,591, said application No. 17/148,095 is a continuation-in-part of application No. 17/094,460, filed on Nov. 10, 2020, now Pat. No. 10,965,784, said application No. 17/094,428 is a continuation of application No. 17/086,909, filed on Nov. 2, 2020, now Pat. No. 10,921,590, which is a continuation of application No. 16/945,765, filed on Jul. 31, 2020, now Pat. No. 10,921,589, which is a continuation of application No. 15/931,958, filed on May 14, 2020, now Pat. No. 10,761,325, which is a continuation of application No. 16/785,970, filed on Feb. 10, 2020, now Pat. No. 10,690,913, which is a continuation of application No. 16/382,448, filed on Apr. 12, 2019, now Pat. No. 10,558,042, which is a continuation of application No. 14/669,744, filed on Mar. 26, 2015, now Pat. No. 10,725,298.

(60) Provisional application No. 63/135,927, filed on Jan. 11, 2021, provisional application No. 63/134,130, filed on Jan. 5, 2021, provisional application No. 61/970,512, filed on Mar. 26, 2014.

(51) Int. Cl.
*G02B 27/01* (2006.01)
*A63F 13/00* (2014.01)

(52) U.S. Cl.
CPC ............ *G02B 27/017* (2013.01); *A63F 13/00* (2013.01); *G02B 2027/0138* (2013.01)

(58) Field of Classification Search
None
See application file for complete search history.

(56) References Cited

U.S. PATENT DOCUMENTS

2018/0268775 A1* 9/2018 Horneff ............... A63F 13/5255

\* cited by examiner

*Primary Examiner* — Peter Hoang

(57) ABSTRACT

Systems and methods according to present principles allow social distancing within themed attractions such as haunted attractions in order to allow the enjoyment of the same in various circumstances. These circumstances include times of pandemic, for customers that are afraid to congregate in large groups, for customers that desire to control aspects of the experience, and so on.

27 Claims, 15 Drawing Sheets

AUTO-SORTED BUT ALLOWING ACTOR SELECTION (SORTED BY EXPECTED TIME OF CUSTOMER AVATAR PRESENTING AT ACTION POCKET)

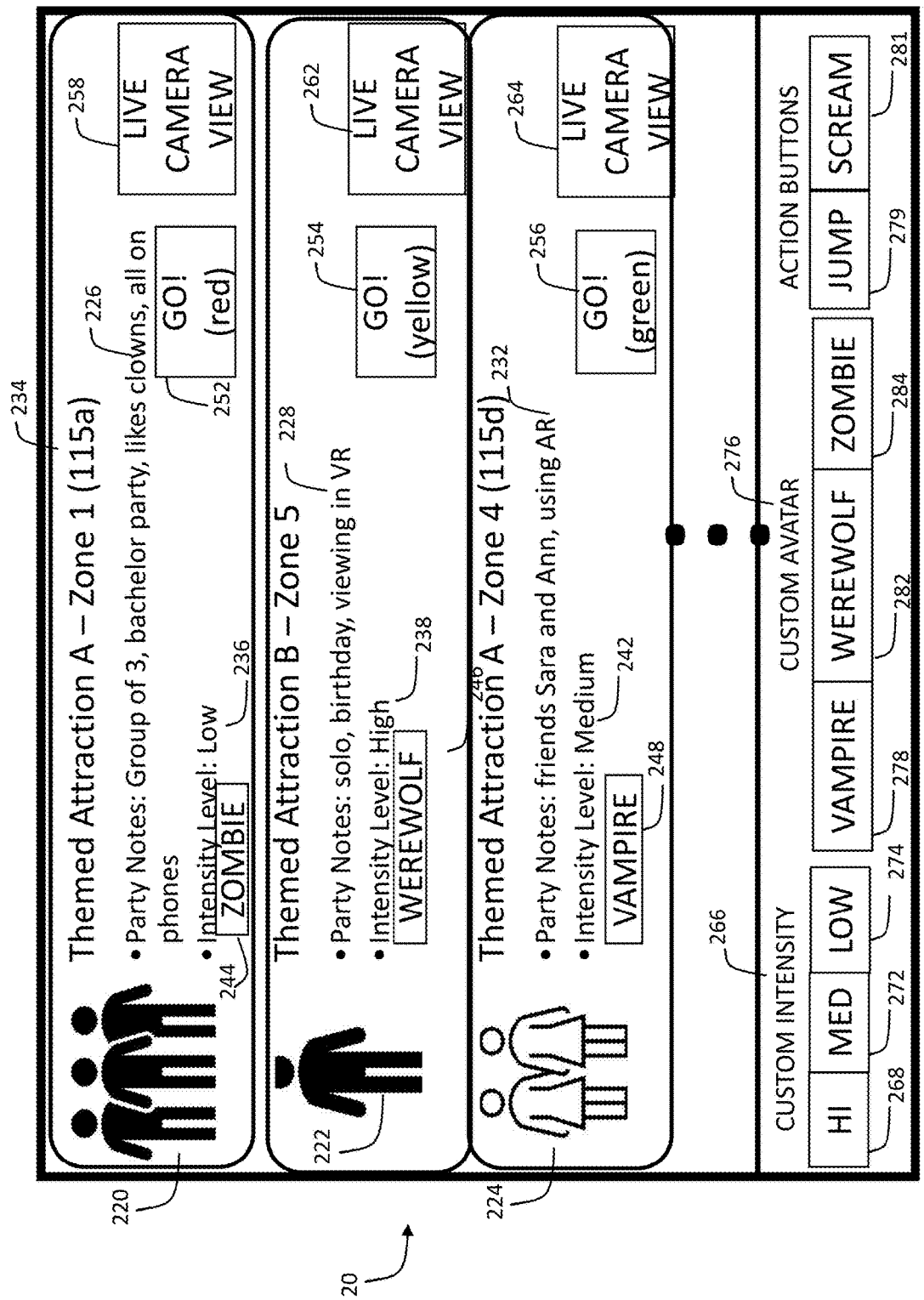
Fig. 8  AUTO-SORTED BUT ALLOWING ACTOR SELECTION (SORTED BY EXPECTED TIME OF CUSTOMER AVATAR PRESENTING AT ACTION POCKET)

[TOP VIEW]

SYSTEM AND METHOD FOR DISTANCED INTERACTIVE EXPERIENCES

CROSS-REFERENCE TO RELATED APPLICATIONS

This application is a continuation-in-part of U.S. Ser. No. 17/389,798, filed Jul. 30, 2021, which is a continuation of U.S. patent application Ser. No. 17/148,095, filed Jan. 13, 2021, which claims the benefit of U.S. Provisional Patent Application Ser. No. 63/134,130, filed Jan. 5, 2021, and U.S. Provisional Patent Application Ser. No. 63/135,927, filed Jan. 11, 2021. This application is also a continuation-in-part patent application of U.S. patent application Ser. No. 17/094,460, filed Nov. 10, 2020, entitled "VIRTUAL REALITY DEVICES AND ACCESSORIES", which is a continuation of U.S. patent application Ser. No. 17/094,428, filed Nov. 10, 2020 (same title), which is a continuation of U.S. patent application Ser. No. 17/086,909, filed Nov. 2, 2020 (same title), which is a continuation of U.S. patent application Ser. No. 16/945,765, filed Jul. 31, 2020 (same title), which is a continuation of U.S. patent application Ser. No. 15/931,958, filed May 14, 2020 (same title), now U.S. Pat. No. 10,761,325, which is a continuation of U.S. patent application Ser. No. 16/785,970, filed Feb. 10, 2020 (same title), now U.S. Pat. No. 10,690,913, which is a continuation of U.S. patent application Ser. No. 16/382,448, filed Apr. 12, 2019 (same title), now U.S. Pat. No. 10,558,042, which is a continuation of U.S. patent application Ser. No. 14/669,744, filed Mar. 26, 2015 (same title), now U.S. Pat. No. 10,725,298, which claims priority from U.S. Provisional Patent Application Ser. No. 61/970,512, filed Mar. 26, 2014. The contents of each of which are incorporated herein by reference in their entireties.

FIELD

The invention relates to the field of themed attractions, and more particular to systems and methods allowing operation of a themed attraction in a safe manner.

BACKGROUND

Virtual Reality (VR) headsets, such as the Oculus Rift®, Oculus Quest, HTC Vive, various Windows Mixed Reality headsets, as well as augmented reality headsets such as the Microsoft Hololens are poised to become a significant new factor in computer environments, including gaming, virtual tourism, and the like. The same may even be gaining popular in times of pandemic, as other sources of entertainment, e.g., theme parks, have been closed. Of course, in times of pandemic, other sorts of computer entertainment become more popular as well.

In addition, themed attractions have been extraordinarily popular for many years. Such range from small individual carnival rides to huge theme parks such as Disneyland. Individual attractions may include both thrill rides as well as so-called "dark rides" that carry a user through the telling of a story. More generally, and citing Wikipedia, "A dark ride or ghost train is an indoor amusement ride on which passengers aboard guided vehicles travel through specially lit scenes that typically contain animation, sound, music and special effects.".

Another type of themed attraction is a haunted attraction, in which typically patrons walk through a "maze" and are treated to various thrills, including so-called "jump" or "startle" scares (delivered by "scare actors"), as well as scenes of varying levels of gore. Other aspects of such haunted attractions may include animatronics, light and sound effects, and the like.

The themed attraction industry was seriously hurt in 2020 due to the novel coronavirus pandemic, which closed theme parks and restaurants, shut down businesses of all kinds, and generally prevented attraction customers from getting together in any sort of high population density, as are common for themed attractions including haunted attractions, popular culture conventions, theme parks, or the like.

This lack of ability to enjoy such pursuits has led to discontent on many levels.

In some cases, such as thrill rides, where riders can be spaced apart and need not necessarily come into close contact with operators, the enjoyment of the ride may still be potentially possible, if the ride is otherwise allowed to operate and appropriate social distancing is observed. In other cases, however, such as in the area of haunted attractions, there is simply no substitute for use of a human actor. Human actors, as opposed to animal, can "think on their feet", adjusting their actions to the perceived desires of the guest, and simply provide better acting, e.g., more effective scares. Generally operators have difficulty employing animatronics to achieve similar levels of interaction, e.g., similar levels of scare.

But having multiple so-called "scare actors" in close proximity to each other and to multiple groups of guests, each with one to several persons, compounds the danger of viral transmission. In addition, some potential patrons are simply afraid to go to such haunted attractions because they are unable to control the experience or are afraid of appearing scared in front of their friends.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Certain implementations of systems and methods according to present principles meet the needs of the above in several ways. In addition, this application incorporates by reference the subject matter of U.S. patent application Ser. No. 14/669,744, now U.S. Pat. No. 10,725,298, owned by the assignee of the present application and herein incorporated by reference in its entirety.

As an introduction, it is noted that the problem of viral transmission in the case of multiple scare actors entertaining multiple guests may be addressed in part according to present principles by the use of networked computer technology, especially where such can provide an immersive environment for an isolated patron, but where the socially distanced or isolated patron is grouped virtually in a common environment with other patrons, as well as with one or more actors, where all or some are represented by corresponding avatars in the common environment, such as is enabled by virtual reality (VR) or augmented reality (AR) glasses, goggles, headsets, or other such head-mounted displays (HMD). In some cases, the immersive environment can be embodied in this way: a user may operate a network computer and be provided with a view of a common environment using a display, e.g., a VR headset, AR headset, or a separate computer monitor. In some implementations, portable computers, such as may be provided by tablet computers, laptop computers, or smart phones, may also be employed, although typically the level of immersion is in some cases lowered as the screen size goes down. Accordingly, where the use of an AR or especially a VR headset or head-mounted display ("HMD") is employed, the level of immersion can be greatly increased.

A user experiencing this immersive environment (which can be a "common" environment in the case of multiple users viewing the same environment) may then be caused to traverse through a maze, which here is intended to be an inclusive term meaning a path or set of paths through which a user travels and during which the user may encounter various interactions with actors. In some cases the interactions are entirely computer-generated, both in terms of their appearance as well as the AI employed to control them. In other cases the interactions are displayed using computer-generated (CG) avatars and CG models, but the interactions are controlled by actual actors who are operating the CG avatars which are situated within the common environment and are viewing the common environment through the viewpoint of the avatar. Alternatively, actors may not themselves have a VR view of the common environment but may still be able to operate an avatar within the same. The actor actions, which may be translated into corresponding or associated or related or correlated avatar actions, and the operation may include head rotations, head translations, hand movements (where the hands are imaged by a head-mounted camera (or other camera) or where the hand movements are indicated by the locations and orientations of handheld controllers), body motions, and on up to full body movements using appropriate body tracking or other such motion capture technology. Various combinations and sub-combinations of these types of operations will also be understood to be implementable.

In some cases the actors and/or the maze is real or actual, e.g., a physical building, and a video of the interaction is transmitted to the user's immersive environment. In the case of a haunted attraction, the interactions may include seeing something scary, seeing something scary that is animated, encountering a jump scare or startle scare caused by an avatar controlled by a human scare actor. Regarding this latter implementation, the human scare actor may be controlling a monster avatar or other such avatar of a scary creature, in the case where the environment is computer-generated. In the case where a "customer" is experiencing a themed attraction by having an actual camera traverse an actual set, i.e., a haunted attraction maze, then the scare actor would be "real" as well, though in video, and would actually jump out at the real camera to elicit the desired entertainment, e.g., a scare.

A disadvantage of such multi-performer themed attractions is that each actor (variously termed "actor", "scare actor", "performer", and the like) spends a significant portion of time standing around, not doing anything, e.g., between arrivals of groups of guests (variously termed "user", "guest", "customer", "client", "patron", and the like). Systems and methods according to present principles allow a single actor, or a small group of actors, to take on multiple roles within a single attraction, and thus allow the same to operate significantly more efficiently. This affordance is enabled by the networked computer technology, which allows a single actor to jump from location to location within a maze. In this way, the actor need not come into close contact with patrons, nor need the actor come into close contact with other actors. This facility is controlled by the actor interface described below. As an additional benefit, a single actor may be enabled to adopt various and different personages at each different location, because all that need be changed is the avatar the actor controls. Moreover, in a particular embodiment, a scare actor can move from one location, often termed a "scare pocket" or more generally an "action pocket", to another location or scare pocket rapidly and can also change the character they are playing, i.e., portraying, by changing their avatar. It is noted that this benefit is a particular benefit of the case where a human scare actor is controlling a computer-generated image or avatar; however, the environment itself can be computer-generated or actual. If computer-generated, then such may be best viewed within a virtual reality HMD. This is also true if the environment is actual (variously termed "actual" or "real" or "real life") but not local to the customer. If the environment is actual and local to the customer, i.e., the customer's house, then the greatest immersion may be via an AR HMD that can directly view the locale (the house) through the AR glass display or a VR HMD that is equipped with a forward-facing camera and can either provide a video feed of what the customer is seeing or can generate a CG version of what the customer is seeing.

In one aspect, the invention is directed towards a method of operating a virtual experience, including: operating a server to communicate with a first user computing environment, the first user computing environment coupled to a first display, the first user computing environment configured to generate a first camera view corresponding to a location of a first camera within a maze, the first camera view viewing an environment displayed in the first display; and operating the server to communicate with an actor computing environment, the actor computing environment coupled to an actor display, the actor computing environment configured to generate an actor interface, the actor interface providing a link whereby an actor activating the link may access and control an actor avatar situated in an action pocket within the environment, where the actor interface further displays one or more entries, and where a display of a particular entry is in part instantiated based on when a user game object associated with the first user computing environment interacts with a respective particular trigger within the environment.

Implementations of the invention may include one or more of the following. The first display may be selected from the group consisting of a virtual reality display, an augmented reality display, a computer monitor, a tablet display, or a smart phone display. The environment may be a common environment, and the method may further include operating the server to communicate with a second user computing environment, the second user computing environment coupled to a second display, the second user computing environment configured to generate a second camera view corresponding to a location of a second camera within the maze, the second camera view viewing the common environment displayed in the second display.

A position and orientation of the second camera view may be the same as a position and orientation of the first camera view. The actor computing environment may include a virtual or augmented reality headset associated with the actor, the virtual or augmented reality headset may include a respective virtual or augmented reality display, the actor computing environment may further include one or more handheld controllers enabling actor interaction with the actor interface, the actor computing environment may further include an input for visualization and depiction of actor hands, where data for the input for visualization and depiction of actor hands is generated in part by the one or more handheld controllers or by a camera imaging the actor hands.

The camera may be external or may be situated on the virtual or augmented reality headset associated with the actor. The virtual or augmented reality headset associated with the actor and coupled to the actor computing environment may be configured to generate an actor view within the environment associated with the activated link. The actor view may be associated with the location and orientation of the actor avatar. The actor view may be associated with the action pocket. The method may further include capturing actions of the actor using the actor computing environment, and may further include operating the server to display a representation of the captured actions within the environment. The captured actions may include 3-dof head movements, 6-dof head movements, hand movements, and so on. The hand movements may be based on hand images captured by a camera or controller movements, where the controller movements may include both controller position and orientation. The hand images may also be captured by a camera and include hand position, and orientation, and optionally hand gesture. The captured actions may include one or more actor vocalizations, and the method may further include modulating the one or more actor vocalizations. The display of the one or more entries may include sorting the one or more entries according to a characteristic time associated with each entry. The characteristic time may be associated with a time duration between a time at which the user game object interacts with the respective particular trigger and a time at which the user game object is expected to reach a location associated with the action pocket within the environment.

The user game object may be associated with multiple game objects, each game object associated with a user. The multiple game objects may be each associated with a user avatar. The multiple game objects may be further each associated with a user virtual camera. The multiple game objects may be each associated with a user virtual camera. The multiple game objects may be associated with respective multiple user computing environments, the multiple game objects each under the control of a respective one of the multiple user computing environments. The multiple game objects may be each allowed to roam under the control of the respective one of the multiple user computing environments, but such that the multiple game objects are constrained against moving outside of a defined area. The defined area may be moved at a nonzero speed through the environment. The nonzero speed may be constant or is varied. One of the multiple game objects may be configured to automatically follow another of the multiple game objects through the maze, the automatically following caused by a user of the user computing environment associated with the one of the multiple game objects.

The environment may include computer-generated components. The environment may further include components based on video data. The environment may be generated using video data.

The video data may be data from a light field camera and the first display may be a VR display or an AR display. The environment may be a real environment and the first display may be an AR display. The method may further include receiving first locomotion data from the first user computing environment, and using the first locomotion data to translate or rotate the first camera view, or both.

The first locomotion data may be received from an accelerometer, a multidirectional treadmill, or a camera in signal communication with the first user computing environment. The first locomotion data may be received from a joystick in signal communication with the first user computing environment. The actor interface may also include one or more action buttons, the one or more action buttons linking to potential actions performed by the actor or actor avatar upon activation of the respective button. The potential action may be an audio action, and where upon activation of the respective button an audio source may be caused to activate within the environment. The potential action may be a visual action, and where upon activation of the respective button the actor avatar may be caused to perform a predefined visual action within the environment. The visual action may be a CG action or a video action.

The actor interface further includes an information section, the information section displaying information about users or user settings associated with one of the one or more entries. The method may further include operating the server to receive one or more user settings from the first user computing environment, and where the received one or more user settings are used to control at least in part an appearance of the actor avatar or of the environment. The method may further include operating the server to receive data about the maze from the first user computing environment, the data about the maze associated with a user desired locale. The received data may be video data or layout data. The method may further include processing the received data to determine locations of one or more action pockets. The processing may include determining using object recognition locations of one or more doors, windows, or cabinets. The method may further include procedurally generating the environment at least in part following the step of operating a server to communicate with a first user computing environment. The procedural generation of the environment may be configured to allow the maze to be traversed by a user in a period of time that is equal to, less than, or otherwise within a predefined duration of time.

The server may be a social networking server. The server may be a server of a social networking site, and the method may further include operating the server to allow the first user computing environment to stream the first camera view to viewers on the social networking site.

In other implementations, systems and methods according to present principles include a server incorporating a non-transitory computer readable medium having instructions stored thereon that cause the server to perform the methods described above, as well as subsets of the steps of these methods.

In yet other implementations, systems and methods according to present principles include one or more headsets incorporating a non-transitory computer readable medium having instructions stored thereon that cause the respective one or more headsets to perform the methods described above, as well as subsets of the steps of these methods. In some cases, the headsets work together to perform the methods as an aggregate system. In some cases the headsets include appropriate computing environments, and in other cases the headsets generally only provide a display and sensors, and the same are coupled to a user computing environment.

In yet other implementations, systems and methods according to present principles include one or more headsets in combination with one or more servers, each incorporating a non-transitory computer readable medium having instructions stored thereon that cause the respective one or more headsets in combination with the one or more servers to perform the methods described above, as well as subsets of the steps of these methods.

Advantages of the invention may include, in certain embodiments, one or more of the following. Enjoyable interactions may be enabled in a way safe from the dangers of viral transmissions. A single actor or a reduced number of actors may be enabled to provide interactions for users, customers, guests, or patrons, because the same may be enabled to quickly traverse from one action pocket to another, as well as to change the appearance of their avatar, due to the virtual nature of the maze and the virtual nature of the avatar appearance. Here it is noted that the virtual maze may be computer-generated (CG) or may be displayed using a video image of an actual physical maze. Enjoyable interactions may be obtainable using systems and methods according to present principles even for patrons who are afraid to go to physical themed attractions or who are unable to do so because of disability or the like. Actors may be enabled to provide interactions at multiple virtual locations in an efficient manner using a UI (also termed an "actor interface") which allows the actor to be notified of upcoming arrivals of patrons, and even to sort which interactions are upcoming in order of their likely occurrence, so as to allow the actor to prepare for the virtual interaction. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 8 shows an exemplary user interface according to present principles. Note that while the term "user interface" is employed for this element, it is generally an "actor" interface, as actors will generally use the same, and the term "user" as described above has been more generally used in connection with patrons, customers or guests.

Like reference numerals refer to like elements throughout. Elements are not to scale unless otherwise noted.

DETAILED DESCRIPTION

VR headsets, while providing high degrees of immersion, can also be very disorienting to a user. Accordingly, it can be helpful to users to have player character (PC) avatars move at a slow rate through the online environment. If a game or online environment is designed for VR, then the PC speed within the environment can be designed to be slow or below a predetermined threshold, e.g., less than 5 mph or 10 mph as measured within the online environment. If the game environment or game application is being retrofitted for VR, then the PC speed can be slowed down to the levels described.

Another disorienting aspect is that one typically games or performs virtual tourism while sitting down, while the PC is walking around within the online environment. This can be disorienting too, if for no other reason than the height differential between standing and sitting.

Figure 1:
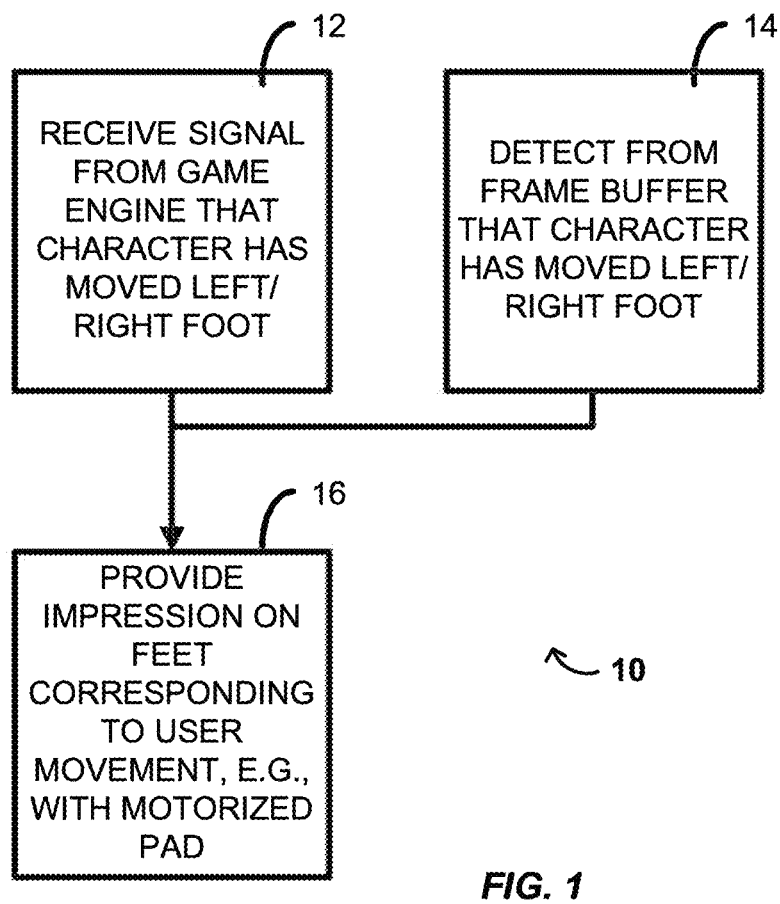
FIG. 1 is a flowchart of a method according to present principles.
Figure 2:
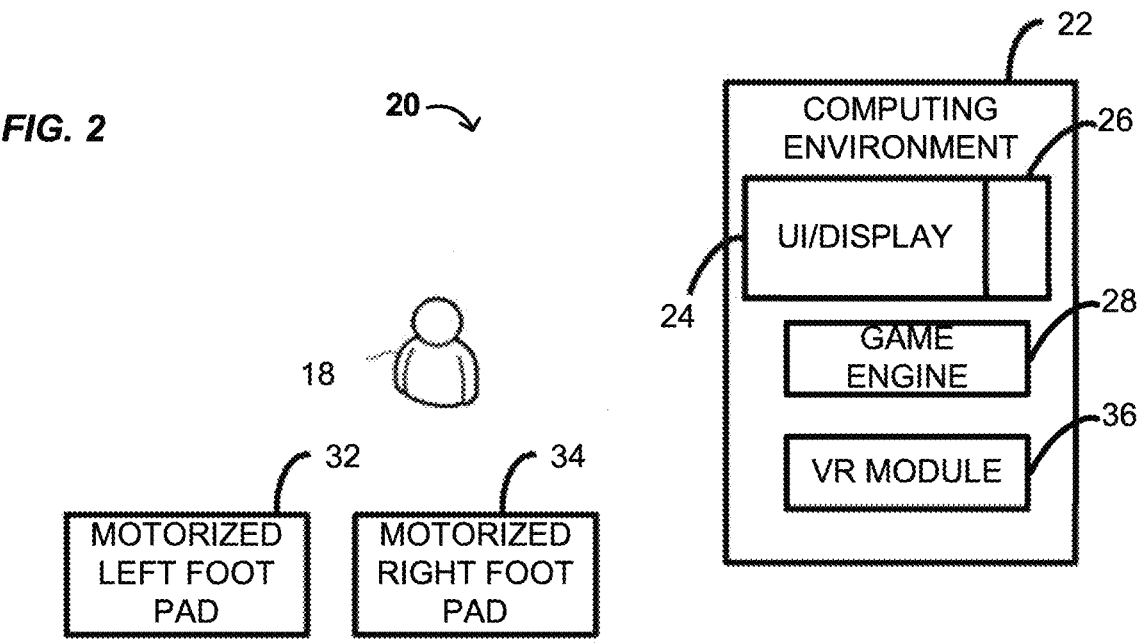
FIG. 2 is a schematic illustration of a system according to present principles.

Various solutions are available. In one implementation, and referring to the flowchart 10 of FIG. 1 and the schematic diagram of the system 20 of FIG. 2, motorized pads 32 and 34 may be placed on the feet of a user 18 and interfaced with the game engine 28 running on a computing environment 22. Alternatively, a frame buffer 26 may read the display 24 and estimate when character appendages (responsible for movement) are striking a surface. The estimation may be performed by a VR module 36 running on the computing environment, or alternatively the VR module may run within a VR headset. When the user walks through the environment, the motorized pads sequentially push up on the pads of the feet of the wearer. The interfacing may be, but is not limited to be, such that when the PC's left foot makes a step in the online environment, the left motorized pad is activated. When the PC's right foot makes a step, the right motorized pad is activated. Speed changes may be recognized, as can force with which a foot strikes the surface, e.g., whether the user is walking delicately or running hard. Standing in place can be simulated by relatively constant pressure on each foot (leaning may also be accommodated). The motorized pads may be conveniently disposed on a surface on which a user rest their feet, or within footwear.

In one method, a signal may be received from the game engine that a character is moving (step 12), and in some cases the signal may even indicate whether a left foot or right foot is currently moving. In some cases the movement, and/or a particular appendage moving, may be detected using a frame buffer analyzing the display (step 14). A VR module, or other input/output module within the game, may then provide an impression on the feet of the user corresponding to the movement of the player character within the game or other virtual environment (step 16). Such an impression may be performed using, e.g., a motorized pad.

It is noted that the accuracy of the motorized pads need not be perfect. So long as the user generally feels forces against their feet, the immersion may be maintained.

Figure 3:
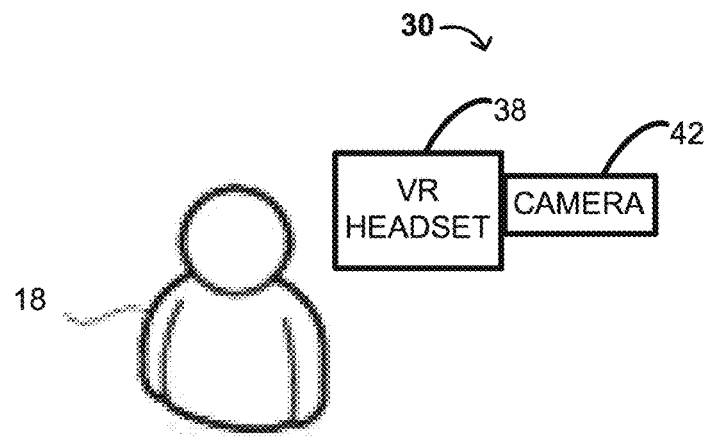
FIG. 3 is another schematic illustration of a system according to present principles.

Another disorienting factor comes from the lack of vision outside of the VR headset, and in particular the aspect that if a user moves their hands up in front of their face, they do not see their hands. While several hand and body sensors exist and can be used to detect when hands should be rendered, such as generally complicated and too expensive for most users. Accordingly, in a system 30 illustrated in FIG. 3, a simple low resolution camera 42, mounted on the VR headset 38, may be employed to detect the approximate position of the user's hands and feed the same into the game engine to allow for the rendering of "approximate" versions of the user's hands.

Various benefits inure to such systems. First, the system may scale to higher resolutions as cameras become higher resolution, cheaper, and lighter (weight is an important factor for inclusion onto a headset). Camera position on a headset is convenient for visualization as there is unity in that what the camera sees is the same as what the user would expect to view from their eye position within the headset.

Figure 4:
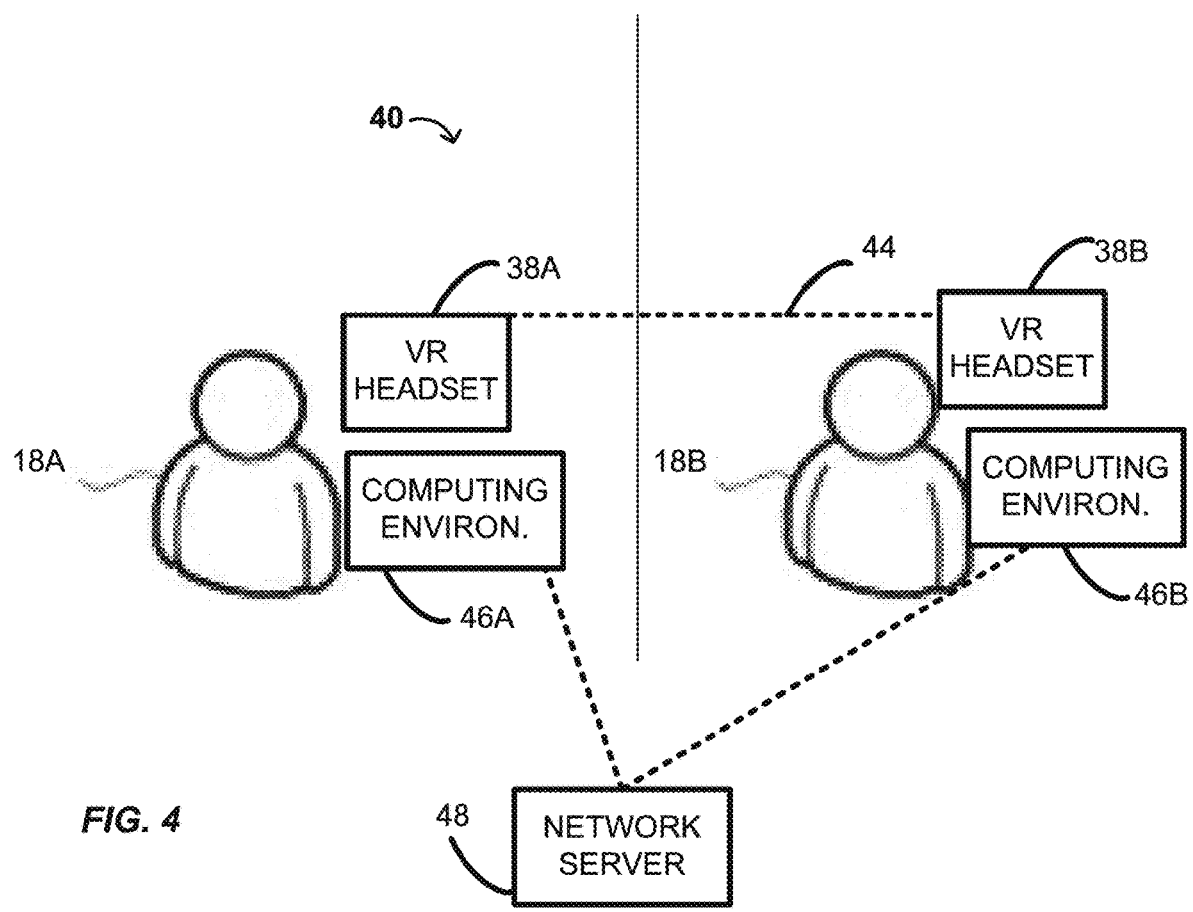
FIG. 4 is another schematic illustration of a system according to present principles.

Another important application concerns multiplayer uses. In particular, and referring in particular to the system 40 depicted in FIG. 4, two users 18A and 18B may each have a respective VR headset 38A and 38B and may be in data communication with each other via a communications link 44, e.g., over the Internet, Bluetooth, LAN, WLAN, cellular communications, NFC, or any other sort of communications technology existing now or developed later. The client application on each person's system, e.g., computing environments 46A and 46B, respectively, which control operations on VR headsets 38A and 38B, may be a thin client or a substantial one. It is noted here that the headsets 38A and 38B may also be embodied by augmented reality (AR) headsets as well. In addition, the headsets may well incorporate all the computing functionality needed to perform the applications described here; this may be particularly true as processor power continues to increase along with miniaturization. The systems and methods according to present principles may work well with both types of systems.

Alternatively, the client systems may communicate via a web application or a hybrid system where one user employs a standalone client and another a web application. The web application or standalone client may form a portion of a network such as a social network where communications occur over one or more network servers 48. For example, a Facebook® application may employ VR headsets and users may be thereby enabled to communicate with each other. In this system, where previously members would communicate with each other via Facebook video or voice chatting, a VR communication application may advantageously take advantage of the virtual reality SDK, e.g., Oculus Rift® SDK, to perform similar functionality.

However, in systems and methods according to current principles, users may go far beyond just seeing each other. For example, each user may have associated therewith an avatar, and various levels of avatar customization can be allowed. In some cases, a selection of hair lengths, hair colors, facial shapes, skin colors, body types, heights, eye colors, and the like, may be employed to allow customization of an avatar. In more advanced implementations, users may be permitted to submit photographs of their head or their entire body to allow a three-dimensional reconstruction of the same to be created and employed in the simulation.

In a particular implementation of a VR simulation within a social network, a "page tour" functionality is enabled where users can give tours of their social networking page to a friend or other reviewer. Users may even record (within the application) a video of such tours, so that others may be enabled to view the recorded tour at their convenience. In a page tour, a first user leads a second user on a tour of the events chronicled on the first user's social networking page. For example, the users may appear to walk down a timeline, with various pictures at respective various locations in time. The first user may point out aspects of the photos or videos to the second user, and one or both users may "teleport" to other pages by following links on the first user's social networking page. For example, if in the past the first user "checked in" at the Eiffel Tower in France, and the first user was giving a tour including that check in to a second user, the first user (or the second user) may click on a link to view a third-party three-dimensional reconstruction of the Eiffel Tower, so as to allow the first user to give a tour of the Eiffel Tower to the second.

In the same way, the first user may "teleport" to a relative's page to point out various family members or the like.

Other variations will also be understood. For example, the background of the virtual reality seen may not be just "black" or static. For example, if the first user is giving a tour of friends to a second user, French scenes may provide a backdrop, and French music may be played as an audio file.

Figure 5:
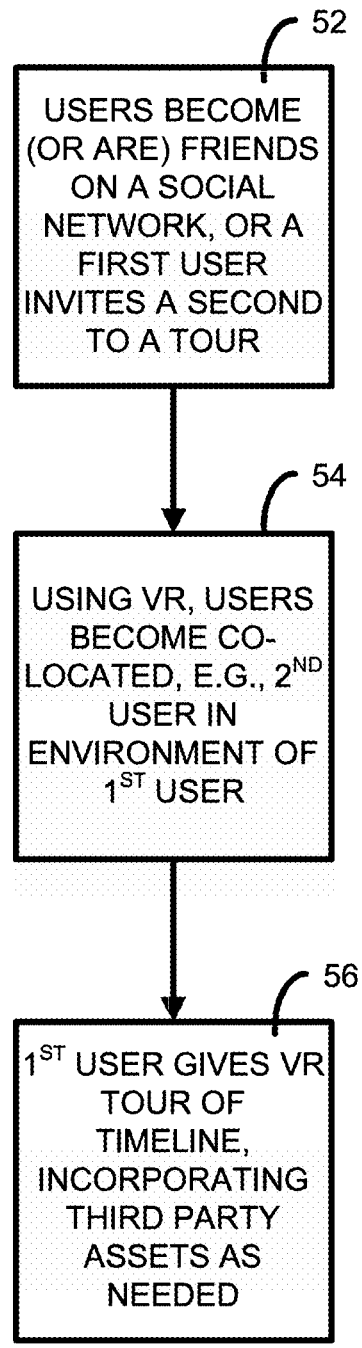
FIG. 5 is another flowchart of a method according to present principles.

In a general implementation, as shown in the flowchart 50 of FIG. 5, a first step is that users become (or already are) friends on a social network, or are otherwise associated within a network, such that a second user is allowed to view aspects and personal information of the first user (step 52). Alternatively, a first user may invite the second user to a tour.

Using virtual reality or augmented reality, the users become co-located (step 54), such that each can see the other, e.g., via the avatars described above, or in other ways. The first user then commences to give a virtual reality tour of the assets available to them, e.g., on a Facebook timeline (step 56). As noted, third-party assets may be incorporated if desired, e.g., to give a virtual tour of the Eiffel tower.

The tour may be in real-time, with both users using virtual reality headsets at the same time, or the first user may record their tour for playback in virtual reality to one or more other users at a later time. For example, such may afford the opportunity for a first user to record a life tour for playback to relatives, friends, and loved ones, e.g., as part of a genealogical history or autobiography. The same may be used in hospice situations to record a life history. The same may also form part of an ongoing VR journal.

Figure 6:
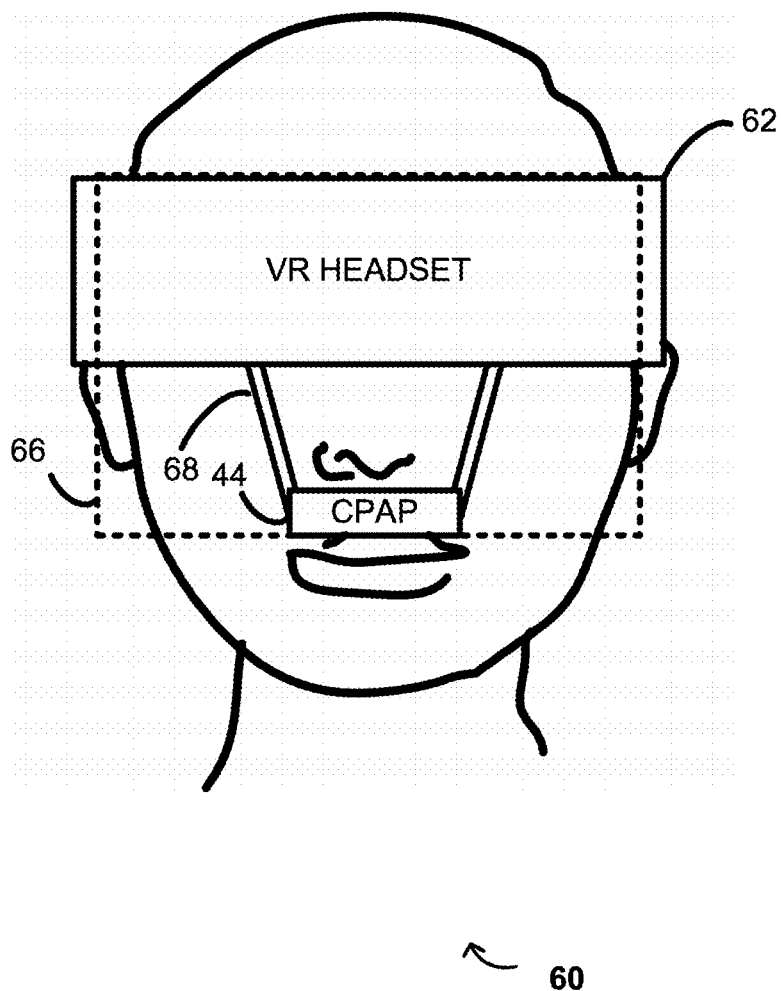
FIG. 6 is another schematic illustration of a system according to present principles.

Other variations will also be understood. For example, and referring to the system 60 of FIG. 6, the immersive headsets described above may advantageously be combined with CPAP machines. In particular, CPAP machines are known to have a low degree of patient compliance because of their uncomfortable character. However, if the VR headset is made large enough, e.g., to envelop the user's nose, as illustrated in the implementation 66, an oxygen supply can be directed through nozzles into the user's nose, performing a positive pressure process, and accomplishing the goals of prior CPAP machines. Alternatively, nozzles 44 may be coupled to the headset 62 but located exterior thereof, e.g., below the headset via pressure hoses 68, so as to allow engagement or positioning adjacent the nasal canal of a user. In use, the same method is performed, with the nozzles directing a positive flow of air or oxygen into the nose of the patient, allowing positive pressure, and accomplishing the goal of prior CPAP machines.

Other variations will also be understood. For example, while VR devices have been disclosed, systems and methods according to present principles may also be implemented within the context of AR devices or other computer monitors or displays.

In addition, it is noted that systems and methods according to present principles can generally not be performed without an appropriate computing environment configured to perform the steps disclosed here. In addition, by performing the steps as described, the computing environment is able to operate in a more efficient manner than virtual reality or augmented reality systems of the prior art.

Figure 7A:
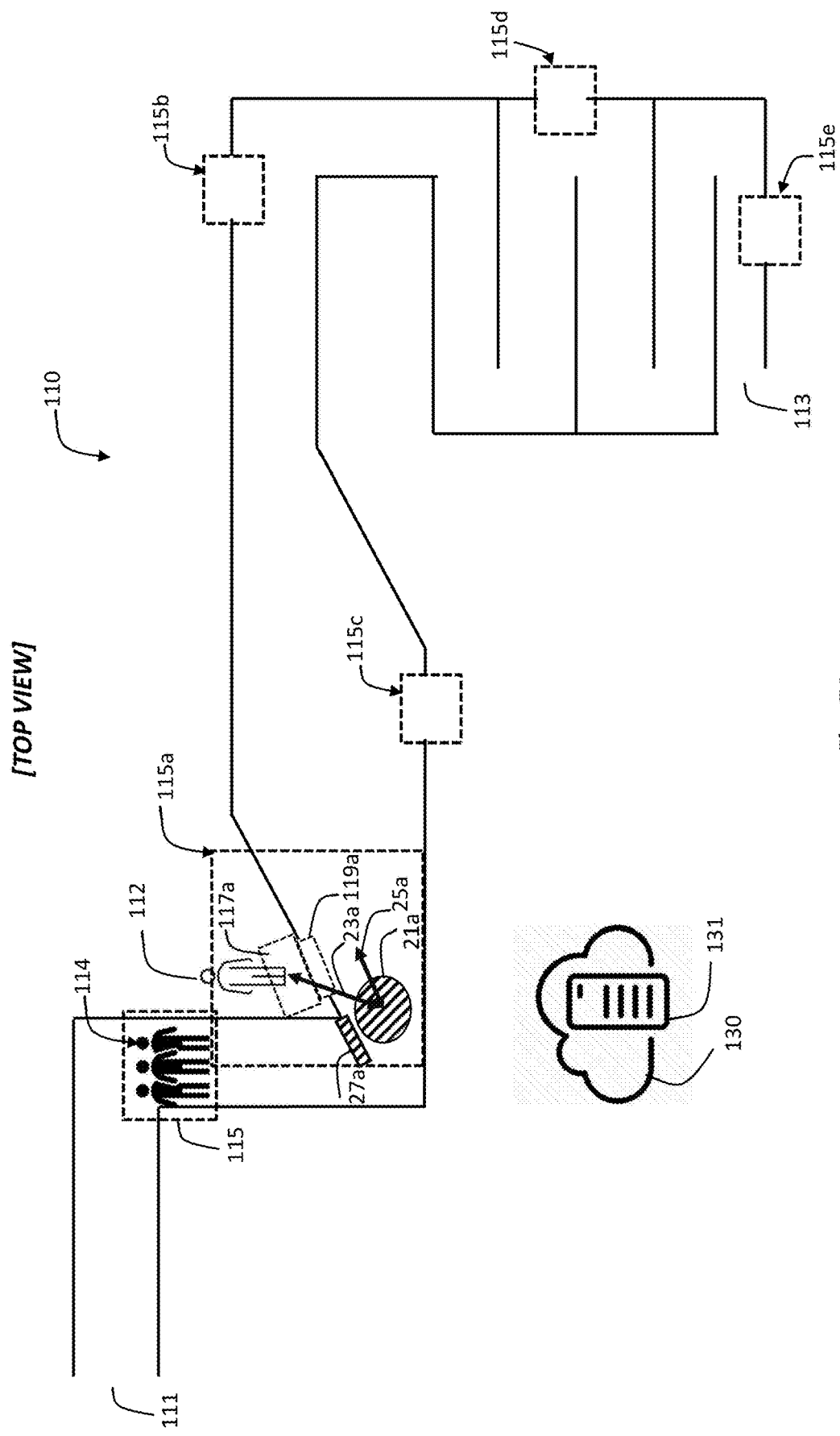
FIGS. 7A and 7B shows a top view of an exemplary maze experience according to present principles.

In alternative embodiments, a particular variation of a common environment may be a themed attraction such as a haunted attraction, e.g., a maze. For example, FIG. 7A illustrates an exemplary maze 110 having an entrance 111 and an exit 113. Various action pockets are shown, such as action pockets 115a-115e. In the case of a haunted attraction, these action pockets are termed "scare pockets". They are generally areas in which an actor controlling an avatar 112 may be situated (e.g., in hiding) until such time as they jump out and interact with a group of patrons or guests represented by avatars 114. In the case of a haunted attraction, the actor-controlled avatar may be caused to may jump out of the scare pocket and startle the patron or patrons, which may or may not have associated avatars. In the top view of FIG. 7A, the patrons 114 would travel down towards the trigger area 21a and would generally encounter (touch or collide with) the trigger 21a when they made a left turn (from their vantage point).

To accomplish the triggering, the avatars of the patrons 114 would either have individual colliders attached or a single collider would attach to their group. In some cases, the patrons may not have avatars, but would still have a virtual camera associated (see camera 216 of FIG. 10), either with each patron or with the group. In this case, the camera may have an associated collider, and the same may be employed to interact with the trigger area. Here it is noted that while the term "trigger area" is used, the same refers to the area pictured in the top down view in the maze, and that actually the trigger area may in many cases have associated therewith a trigger volume. The trigger area 21a (or equivalently, volume) would similarly have a collider attached, and by testing when the collider associated with the patrons 114 (or patron avatars) intersected with the collider associated with the trigger area 21a, the trigger would be activated. In some cases the patrons 114 (or their avatars) would have a mesh collider that maps to the general shape of their avatar, or the same could be more simply associated with a box collider that closely matched the size of the group. Alternatively, the avatars may each have associated therewith a cylindrical collider that roughly matched the "cylinder" shape of the avatar body. These collider types may be similar for that of the trigger area 21a. In many cases a cylindrical collider (out of the plane of the page of FIG. 7A) may be employed. In another implementation a box collider that is roughly the shape of a rectangular solid may be employed, and such as indicated by box collider 27a which may be situated as is or also "around the corner" and perpendicular to the current orientation of box collider 27a. Other orientations and shapes will also be understood.

The trigger area may, in some cases, be an actual area, or have a planar shape, in the case where the CG maze and avatars are generated as computer models termed "rigid bodies" and can thus be controlled to act under a computer-generated influence of gravity; then the avatar appearing to step on the trigger area may act to instantiate an entry on the actor interface.

Returning to the discussion of FIG. 7A, once the patrons have reached the trigger area, and once the actor has activated the appropriate link as described below in connection with the actor interface, the avatar 112 may be instantiated and appear at an action pocket or otherwise within the maze or other instantiation point. In one implementation, the location of the avatar 112 may be within the action pocket 117a, ready to move through the access hole 119a into the maze to perform the interaction. It will be understood that in some cases there need be no rigid body or collider on that part of the wall of the maze, and thus the avatar 112 may simply move directly through the wall. However, for purposes of immersion, it may be preferable for the avatar to actually appear to emerge through a doorway or hole, so as to heighten the immersion of the user.

There is generally associated some characteristic length or distance between the trigger area 21a and the actor 112. Two of these are shown in FIG. 7A. Distance 23a shows the distance between the center of the trigger area 21a (or volume) and the center of the action pocket 117a (or equivalently, volume). Distance 25a shows the distance between the center of the trigger area 21a and a perpendicular distance to the center of the action pocket 117a if the actor 112 were to emerge through the access hole 119a. Distance 25a may be more useful such that the actor 112 may be more likely to be aware of when the patrons 114 are passing the area of the action pocket. But it will be understood that either could be used and that various other characteristic distances may be employed according to the needs of the interaction or the desire of the actor or operator.

Figure 7B:
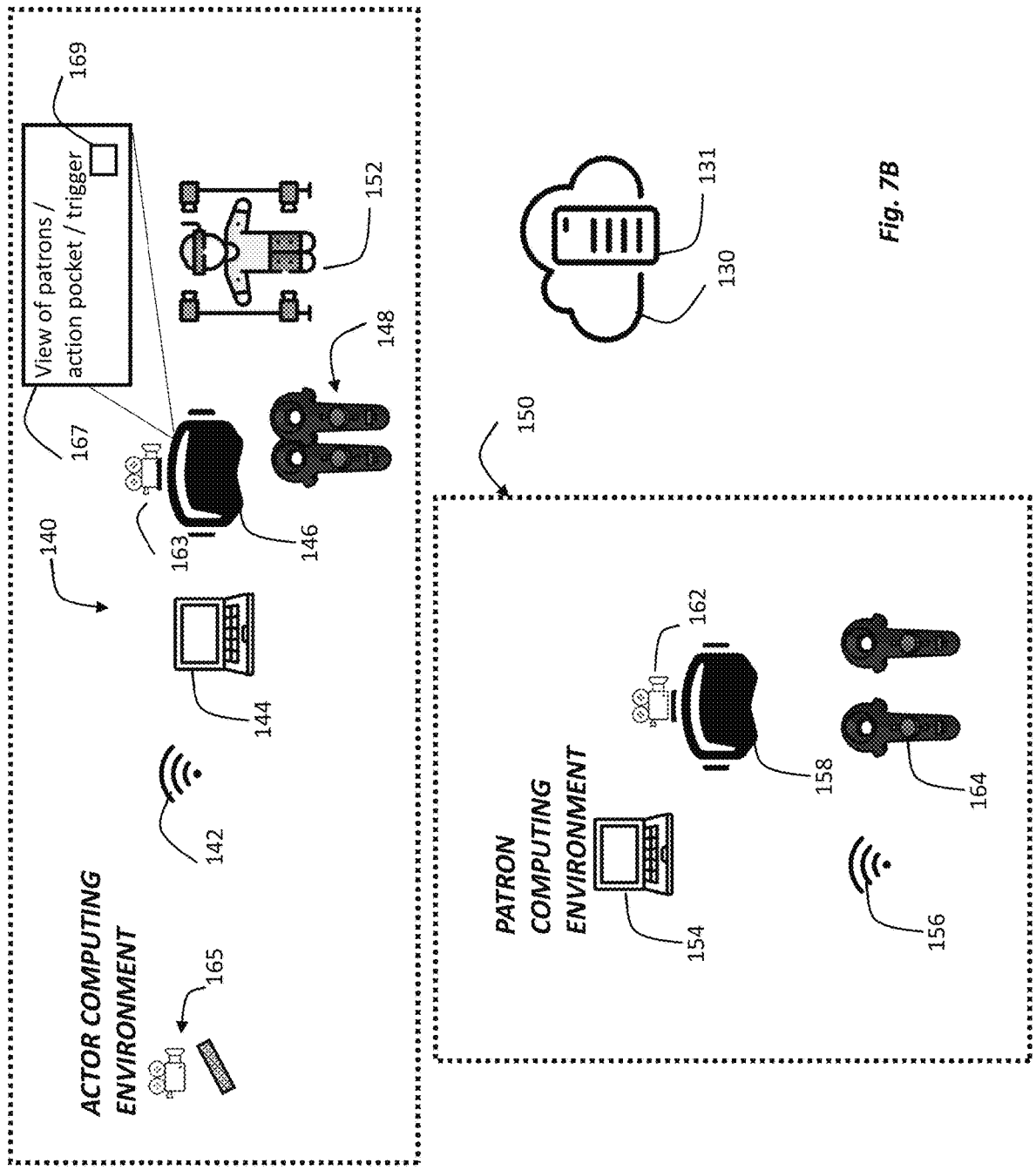

As may be seen in FIG. 7B, the actor that controls avatar 112 generally uses an actor computing environment 140. The actor computing environment 140 includes a computer 144 which may be coupled to the cloud 130 through a Wi-Fi connection 142. In some cases the actor can increase their own immersion in their acting by use of an HMD 146, which may further include controllers 148. As shown by the inset, a heads-up display or HUD 167 (or just regular VR display) of the HMD 146 may provide a view of the patron(s) from the action pocket, as well as potentially the trigger area, or whatever view may be set either the operator or actor to best serve the purposes of providing, preparing for, and delivering the interaction. The display 167 may include a button 169 to allow the actor to return to the actor interface. This button 169 may be termed a "Back to UI" button. Typically, the actor employs the actor interface to enter an area or action pocket near where an interaction with patrons will occur; then to return to the UI, the actor may activate the button 169.

The controllers 148 may be employed for various purposes as described, including operation of the actor interface as well as for detecting a location of the actor's hands, and thus allowing visualization of the same, as well as adjoining parts, e.g., arms, upper body, and so on. A camera 163 may also be employed for this purpose. In certain cases, for the best fidelity for reproduction of the actor's entire body movements, a motion capture system 152 may be employed. A camera and green screen system 165 may further be employed to allow video capture of actor actions, and however the actor action data is obtained, the same may then be entered into the computer 144 (if necessary) and up to the cloud 130 such that the server 131 may be operated to perform the desired functionality described herein.

Similarly, the user, customer, guest, or patron may employ a patron computing environment 150. It too is connected to the cloud 130, which includes a server 131, but in this case through a Wi-Fi connection 156.

The patron computing environment 150 may include a computer 154, coupled to a display which may be a typical laptop or desktop display or a HMD 158. As noted above, the HMD may be all-in-one and thus include the computing system integrated within the headset, or the same may simply provide a display and sensors that are run by a separate computing environment (the same is true for the HMD, if employed, of the actor). For visualization of the user's environment, hands, and so on, a camera 162 may be employed, which may be external or mounted to the HMD. The patron may further employ controllers 164 to allow entry of data including input settings, locomotion, and in some cases even virtual interactions with the actor. For example, in the case of a haunted attraction having scare actors, the controllers 164 may allow the user to "fight back" against the scare actor avatar 112.

How the system implemented for the maze of FIG. 7A may be employed according to present principles is now described. In more detail, implementations and arrangements according to present principles include systems and methods wherein a user (or customer or client or patron) is enabled to enter and to follow a path through a maze (this term is intended to include any sort of system of paths (or just a single path) to enjoy interactions at one or more locations within the maze), and then to exit the maze (either through a virtual exit or by their virtual camera view or avatar or both fading out and transporting away from the maze experience). These interactions may be along a path, in which case the system operator determines the order of interaction, or they may be along multiple paths or even no paths at all, in which case the user determines the order of interaction.

It is noted that if the maze has no path, then the location of the trigger area with regard to a particular action pocket may be more nuanced. Several trigger areas may be employed that "feed" into a particular action pocket, or the trigger area may be closer to the action pocket than in the case where there is a path, in order to more unambiguously determine the presence of a patron. In such circumstances it may be more important for the actor to use a view provided, such as a video feed, to view upcoming guests, in order to determine the right time to emerge from the action pocket or to otherwise start the interaction with the patron or set of patrons. Alternatively, multiple trigger areas may be employed to determine a trajectory of the user, to ensure that the user is traversing in a direction appropriate for the interaction. In other words, multiple trigger areas, if monitored appropriately, may determine that the user is traveling in a particular direction. If this is a desired direction and appropriate for the action pocket, then the user may be instantiated as an entry on the actor interface. If the determined direction is not appropriate for the action pocket, the system may determine that the interaction is inappropriate, and the user or set of users may not be caused to be instantiated as an entry on the actor interface, and thus no interaction will occur.

Varieties of embodiments exist, and a nonlimiting list is tabulated in Table I below. Here certain varieties are listed which are currently believed to be of certain interest:

1. A user (with or without being "embodied" by an avatar (the user may simply be represented by a camera having a view of the maze)) (or a group of users) traverses through a CG maze (which may be predefined or which may be procedurally-generated) and real or actual actors (also embodied by avatars) interact with the user(s) in predefined or procedurally-generated "action pockets".
2. A user (or group of users) receives a video feed of an actual camera that is traversing a real or actual maze, and real or actual actors interact with the camera (and thus with the user (viewer) of the camera).
3. A user (or group of users) receives a video feed of an actual camera that is traversing a real or actual maze, and CG characters (controlled by actual actors) act in locations associated with action pockets and the CG character actions are overlaid on the video feed.
4. A user (with or without being "embodied" by an avatar as noted above) (or group of users) traverses through a CG maze (which may be predefined or which may be procedurally-generated) where the CG maze is based on a locale known or local to the user. For example, the maze may be based on a layout of the user's home, school, workplace, recreation center, and so on. Action pockets, termed "locale action pockets", may be identified or determined. In the case of a haunted attraction, these locale action pockets may be identified or determined as locations through doors or windows or other such locations in which the avatar of an actor can be hidden or obscured. Real or actual actors, embodied by avatars, may then virtually interact with the user in these locale action pockets. In the case of a haunted attraction, an actor may jump out from a locale action pocket to scare the user(s), and the impetus for the time of the "jumping out" may be an indication on an actor user interface as described below.
5. In an alternative embodiment to #4, the user may actually be traversing through the locale, and the locale may be imaged either directly (through an AR HMD) or through a camera (through a VR HMD). In this alternative embodiment, in the case of the VR HMD, the locale may be a direct video feed of the camera view or may be virtual, e.g., a CG re-creation of the locale. As above, action pockets, termed "locale action pockets", may be identified or determined. In the case of a haunted attraction, these locale action pockets may be identified or determined as locations through doors or windows that are visible by the user camera, just beyond the sight of the user (in this way an avatar of an actor can be hidden or obscured from view). Real or actual actors, embodied by avatars, may then virtually interact with the user in these locale action pockets. In the case of a haunted attraction, the actor may cause his or her associated avatar to appear to jump out from a locale action pocket to scare the user. The appearance of the avatar would be either superimposed on the actual view of the locale in the case of AR HMD or would be superimposed on the video or CG view of the locale in the case of a VR HMD.

A common motif in some of these varieties is that: (1) customers are separated from performers, (2) customers can be (if desired) separated from each other (e.g. if they are not from the same family or 'pod' as that termed has been developed to mean those who live with or close to each other and thus do not face particular additional viral transmission risk by contact), and (3) performers can be separated from performers. Performers may be separated from performers because the actual number of performers needed to populate the themed attraction or maze experience may be lessened because each performer can occupy multiple action pockets. Of course, to provide a personal interaction, each performer (or more correctly, each performer's avatar or video image) can only provide one interaction at a time, e.g., can only perform one interaction associated with a particular action pocket at a time. However, assuming that multiple action pockets need not be populated at any one given time, the performer can simply traverse practically instantaneously between action pockets using an appropriate actor interface, as is described below, and thus provide interactions were ever the same are needed. In some implementations, processing may be employed to change the gait of an actor (embodied by their avatar) so as to obscure the fact that one actor is performing multiple roles. This processing may be employed to change the gait, speed, or angles of movement, or other visual characteristics. Such may be particularly important as gait is a clear indicator of identity, even if users are unaware of their use of the same in this context.

The ability to traverse instantaneously is provided by the actor being "virtual", either using a CG avatar or using a video of the actor. Of course, in situations where a video of the actor is employed, the portions of the actor that are provided in the video can generally not be quickly changed. In other words, if the entirety of an actor's body is provided in a video image, that actor generally cannot change costumes as quickly as an actor using a CG avatar can change avatars. But, in some implementations, the body of the actor may provide an anchor and different (separate) avatars may be superposed atop the anchor body so as to allow the actor to appear to have different costumes on (as well as different heads and/or faces), thereby portraying different characters or avatars. In the case of a haunted attraction, the face, hands, and general body shape may be maintained, but the clothing may be changed from one type of character to another, e.g., a vampire to an undertaker. Various filters may be applied to allow the appearance of the face to change as well, e.g., from a pale vampire to a hairy werewolf or a decomposing zombie. Of course in other cases the entire CG rig and/or underlying character avatar body may be changed for each different action pocket, or according to the needs of the interaction or maze experience.

Timing of Actor Interaction

As noted above, a characteristic distance may be associated from a trigger area (or volume) to the location of an actor. This characteristic distance may in turn be associated with the time from which a patron or group of patrons activates a trigger to the time at which an actor is to perform an interaction with the patron or group of patrons. In the case of a haunted attraction, several users may pass a trigger area, and the trigger may be employed to notify the scare actor that the group of patrons is soon to pass the scare pocket, and thus the scare actor should prepare himself or herself to jump out from the scare pocket to provide the interaction, e.g., the scare. The characteristic distance may be associated with a characteristic time for this preparation, with an analogy of the well-known formula characteristic time=characteristic distance/characteristic speed or velocity. Here the characteristic speed or velocity can be, e.g., the speed of the fastest moving patron, the speed of the slowest moving patron, an average speed of all the patrons, a speed of a defined area 115 that the patrons are traveling on, via a "rail", or various other speeds.

For example, if the scare actor 112 desires to scare the first patron to arrive adjacent the scare pocket 117a, the actor may use (using a setting provided either by the operator of the attraction or on the actor interface described below) the speed of the fastest patron. If the actor wanted to scare the last patron to arrive, the actor may use the speed of the slowest patron (again using a setting as described above). If the actor wanted to scare the patrons in the middle of the group, he or she may use a mean or average speed. Of course it will be understood by one of ordinary skill in the art that the term "patron" above is intended to mean the avatar of the patron within the virtual common environment. In some cases patrons will not have an avatar, but will simply have a view of the common environment via a camera, e.g., a patron camera, which can either be provided for each individual patron or one mutual camera can be provided for all patrons. In either case, an indication may be provided, e.g., via the video feed on the actor interface, of the location of the camera, e.g., relative to the action pocket, such that the actor knows where to direct the action of the actor avatar. Put another way, and in the case of a haunted attraction, the scare actor needs to know where the patrons are so that he or she knows where to direct the scare.

Other examples will also be understood given this teaching. For example, a particular actor may be employed to interact with multiple customers in a group by performing an interaction once (e.g., in the case of a haunted attraction, a jump scare) but having the interaction be duplicated and displaced (using the CG system and performing a translation and displacement (and in some cases rotation) of the displayed action) so that the interaction appears to be facing each patron (avatar or camera) rather than only one. In this way, each customer gets a benefit of the interaction directly to themselves rather than just seeing the avatar of the actor address the group as a whole. In some cases this may require processing to change the speed, if any, with which the actor avatar approaches the group, so that the avatar approaches, is incident, or impinges on each patron avatar at the same time. Of course, not every interaction benefits from this. However, in the case of a scare interaction of a haunted attraction, it may be highly beneficial and enjoyable to have the scare directed at each customer, as that increases the scare level and thus the enjoyment. Of course, to allow the same to not become predictable, a random number generator may be employed to determine which patron avatar the scare is directed at. Combinations of the above and other features are also possible and will be understood.

It will be understood that the position of the avatar of the scare actor may be translated not only within the plane of the maze to address a particular patron but further may be translated out of the plane (up or down) of the maze such that the actor's avatar can appear to be taller or shorter than each user's avatar (or if the patron is not employing an avatar, the height of the camera causing the view for the patron). In the case of a haunted attraction, it is common to desire the monster to appear higher or towering over the patron's eye level to increase the amount of fear induced.

In addition, it is noted that there may be limitations on the extent to which actor avatar location may be displaced or translated (or rotated) so as to appear to each patron individually. In particular, there may be props which are part of the interaction that cannot similarly be moved without appearing unphysical to the user, thereby breaking the immersion. For example, an actor avatar may be a crazed doctor behind a operating table. The operating table may be a fixed location prop; accordingly, a restraint may be placed on the translation or displacement of the actor avatar, such that the same remains behind the operating table (though some movement per patron may still be accomplished).

GUI (or Actor Interface) For Customer Interaction

As noted above, it is an advantage of systems and methods according to present principles that a single actor may be employed to provide multiple actor/patron interactions, even at far-flung virtual distances between points in a virtual maze. But this functionality requires that the actor know when to appear at a particular action pocket.

FIG. 8 thus illustrates an exemplary user interface 20 which may be employed to notify the actor of when upcoming interactions should occur. FIG. 8 illustrates a vertically-sorted list of groups of patrons. In the actor interface 20, a group of three icons 220 represents one group of patrons having three members, a single icon 222 represents a single patron going through the maze individually, and the icon 224 represents two friends going through the maze together. In alternative implementations, the actor interface may have icons that do not indicate the number of patrons. That is, in some cases an icon of one person will be shown no matter whether it represents one patron or several. But in many cases multiple patrons will traverse a maze together, and in these situations multiple icons may be displayed, one for each patron, and the visualization may either be of the patron's avatar or of the patron him or herself if such an image is available.

Various character or avatar notes may be provided for each interaction, so that the actor can remind themselves of what sort of character they are playing (that is in turn visualized by the actor avatar). These are indicated by notes 244, 246, and 248. For example, if the actor is playing a werewolf 246, they may be reminded of this and thus inherently (or even explicitly, by another note) be reminded to growl instead of to speak (as noted below, voice modulation may also be employed to manually or automatically adjust the actor's voice).

An indication may be provided of which maze experience or themed attraction the patron is going through, and these are shown by indicator 234 and the like, e.g., Themed Attraction A, Zone 1 (e.g., corresponding to action or scare pocket 115a). A live camera view may be shown to show or indicate the patron or group of patrons as they approach the action pocket, and these are indicated by sections 258, 262, and 264. These camera views may be advantageously selected to provide a view from the action pocket to the trigger, so as to allow the actor to see the patrons as they approach the action pocket.

Other notes may also be provided, e.g., with sections 236, 238, and 242, as to a level of interaction. A low level of interaction in the case of a haunted attraction may mean that the user only wants to be frightened a little. A high level of interaction may mean that the actor should "pull out the stops" and act in such a way so as to provide or deliver as much scare as possible. As will be described below, this may include employment of haptic forces.

Party notes may be provided to give the actor an indication of additional details about the party, e.g., group of patrons, and such are indicated by party notes 226, 228, and 232. This may allow the actor to tailor a particular interaction according to details about the party, so as to increase the overall enjoyment of the patrons.

Each grouping of elements 220 (patron images or patron avatar images), 234, 226, 236, 244, 258, and 252 (described below) constitutes an "entry", and these entries may be automatically instantiated when each patron or group of patrons (more correctly, their avatars) reaches the trigger area. It will be understood that the trigger area may be preceded by a pre-trigger area, to give additional warning as to the soon-to-be impingement, incidence, or arrival of patrons (patron avatars) at the action pocket.

In FIG. 8 the entry corresponding to "Themed Attraction A—Zone 1" has been sorted to be at the top, and this may be where the actor looks first when determining where will be the next interaction to be delivered. This "next interaction" may be made more prominent by a different color, and enlargement of the overall entry on the actor interface, and so on.

The sorting of the entries may be on various bases, but a useful type of sort will be an automatic sort based on characteristic time as described above, sorted from low to high. In other words, the patrons that the actor will have to perform for first are located at the top of the list, and the rest of the list may be sorted by increasing characteristic times. Colors may also be employed such as the red, yellow, and green buttons shown, i.e., buttons 252, 254, and 256, as mentioned above. The buttons shown are provided with the word "GO!" because it is through selection/activation of these buttons that the actor may be caused to occupy and control an avatar within or associated with the action pocket, e.g., may be caused to occupy and control avatar 112 within scare pocket 117a (in the case of a haunted attraction). Once the actor activates the button and controls avatar 112, the actor may provide the interaction to the patrons, e.g., may jump out and scare the patrons in an area of the maze adjacent the action pocket (or within the same, or a combination), and then may back away back into the action pocket 117a. The avatar controlled by the actor may also be caused to just disappear, but as this is an unphysical sort of display (not occurring in a real-life haunted attraction), it tends to reduce immersion. But once the avatar of the actor is back into the scare pocket or otherwise no longer visible to the patron or patrons (which may also be accomplished by way of a fadeout), the actor may activate a button (either physical (e.g. on a controller) or in a UI viewable when they are embodying and controlling the avatar 112) and may then view the UI 20 again, e.g., to prepare for the next patron interaction, e.g., that within themed Attraction B as illustrated. As noted in the description with regard to FIG. 7B, the button 169 may be employed for this purpose. This button may also be activated even when the actor is not in the action pocket.

In an alternative implementation, rather than having the actor have to activate a button to get back to the user interface, only to have to push another button to move on to the next interaction, the actor may be caused to automatically go from one interaction to the next. To provide the most possible time for each interaction, the transition to the next interaction may be held off as long as possible, e.g., until such time as the next interaction is about to occur, or is about to occur within a predetermined timeframe, e.g., five seconds, 10 seconds, and so on.

To allow the actor to receive the necessary information for the next interaction, a UI within the actor system 140, e.g., which may be a desktop system or a VR/AR system, may provide a heads up display (HUD) with the necessary information, e.g., which attraction, what kind of patron, level of scare, and so on.

In many cases it is preferable that such occur by way of a HUD because the actor, in order to perform the necessary interactions, may likely be standing and away from a desktop or laptop display. Of course, a display may be mounted on the wall or at other convenient location to allow the actor to quickly see which interaction is coming up next. If on the wall, the actor may employ an AR HMD to allow themselves to see the wall display (or desktop monitor) as well as provide some visualization of the patron's avatars who are about to enter the area adjacent the action pocket, such that the actor knows the precise time in which to deliver the interaction, e.g., scare.

Besides the preprogrammed or intended avatars and intensities planned by the operator and programmed into the system, the actor may be employed via the actor interface 22 modify their avatar, the intensity, as well as to perform certain preprogrammed actions. To accomplish this, a custom intensity section 266 may be employed, where the actor can adjust the intensity using buttons 268, 272, and 274, so as to change the intensity to either high, medium, or low. As noted elsewhere, this may accomplish a change of avatar, volume, type of audio, whether haptics are included, and so on. A custom avatar section 276 may be employed to provide buttons 278, 282, and 284, showing labels which are simply exemplary, so as to allow the actor to take on a particular avatar look, even if the same is not intended according to a program of the maze. This custom avatar functionality may be employed to allow interactions to occur out of sequence if necessary to accommodate unexpected patron movements, or to just provide a level of unexpectedness to the maze encounter. Preprogrammed action buttons 279 and 281 may be employed to perform commonly performed actions, so that the actor need not actually physically perform them each time. As may be seen, these include a jump functionality, which is typically a visual action, as well as a scream functionality, which is an audio function. Particularly where actors are going from action pocket to action pocket continuously, having preprogrammed actions may help to save the actor's energy and voice, as the actor need only push a button rather than perform the action physically. In some cases the performance of these actions by the processor may be provided with a degree of randomness, e.g., the action speed or exact appearance may vary, so as to not appear to be operated on a program.

Devices employed by the actor are described in greater detail above and below, but here it is noted that the same may be a VR/AR headset 146 with an appropriate associated display and computing environment. Generally controllers 148 will be needed such that hand movements (and thus arm and upper body movements as well, generally) may be inferred and displayed to the patron, or these may be visualized by an associated camera 163, either mounted on the headset 146 or placed externally. In general what is needed on the actor side is some way to capture the motion of the actor, either in a CG fashion or in a fashion that allows video capture, e.g., with the use of a green screen and camera using system 165 (see FIG. 7B).

In certain cases the level of interaction, which is generally set by a user or the user's representative in an introduction screen, may be employed to automatically adjust avatar appearance, volume of sound heard by the patron, and so on, so that the actor need not make such adjustments himself or herself. For example, in the case of a haunted attraction, a scary-but-cartoonish avatar may be employed for patrons desiring low levels of interaction, a scary but more realistic avatar may be employed for patrons desiring a medium level of interaction, and a gory and scary avatar may be employed for patrons desiring a high level of interaction. For patrons desiring extreme levels of interaction, haptic forces as well as a gory and scary avatar may further be employed. Where multiple patrons form a group and request different levels of interaction, that of the lowest level may be used, or in other cases different levels may be provided to different patrons, all based on the same actor action by having the levels of interaction be automatically adjusted for each patron according to their input setting.

Figure 9:
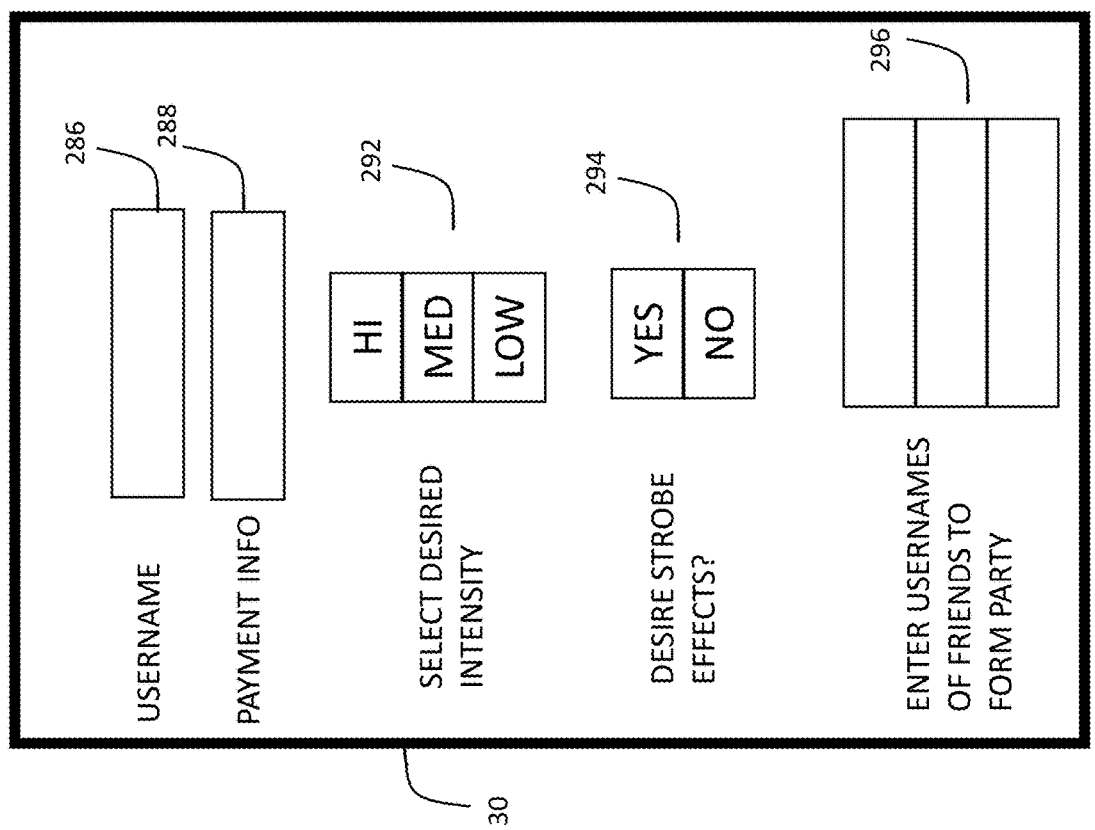
FIG. 9 shows another exemplary user interface according to present principles, illustrating an introductory screen allowing a patron to adjust aspects of the interactions in the maze experience, e.g., the intensity.

FIG. 9 illustrates an exemplary introductory screen 30 such that a user or patron may enter certain settings to be followed during the maze experience. Here the user may be enabled to enter a username 286 (which may be displayed above their avatar or used in a separate chat screen), payment information 288, the desired intensity via a set of buttons 292, an indication as to whether they desire strobe effects 294, as well as a form 296 to enter usernames of friends, so that a party can be formed.

And while the visual appearance of the actor avatar has been described above, it will be understood that audio emanating from the avatar (generally using 3D sound and with the audio source of the sound located at the location of the actor avatar, and the game object of the audio source may be located as a child object of the game object representing the avatar or other avatar rig) may similarly be graduated to perform various functionality. For example, the volume may be adjusted according to the level of interaction desired. In some cases, the sound may be modulated to raise or lower the pitch of the actor's voice, to appear to change the gender of the same or to provide scary sound effects such as are known in the field of audio effects. In this way, the actor need not overly stress their voice in trying to convey certain effects, e.g., a scream in the case of an interaction in a haunted attraction.

It will be understood that in alternative implementations the actor interface may be such that the future patrons are displayed horizontally. Again such may be automatically sorted by time to appearance, which may be calculated as the amount of time remaining before the patron or group of patrons (i.e., their avatars) present at the action pocket, which may be in part based on the distance between the action pocket and the trigger area, as well as the speed in which the patrons are traveling. This "amount of time remaining" is referred to in some implementations as a "characteristic time". In addition, the actor interface may also indicate the type of device employed by the patron, e.g., whether they are employing a VR or AR headset, or whether they are employing using non-headmounted devices.

Environment Visualization
Computer Generated (CG)

Figure 10:
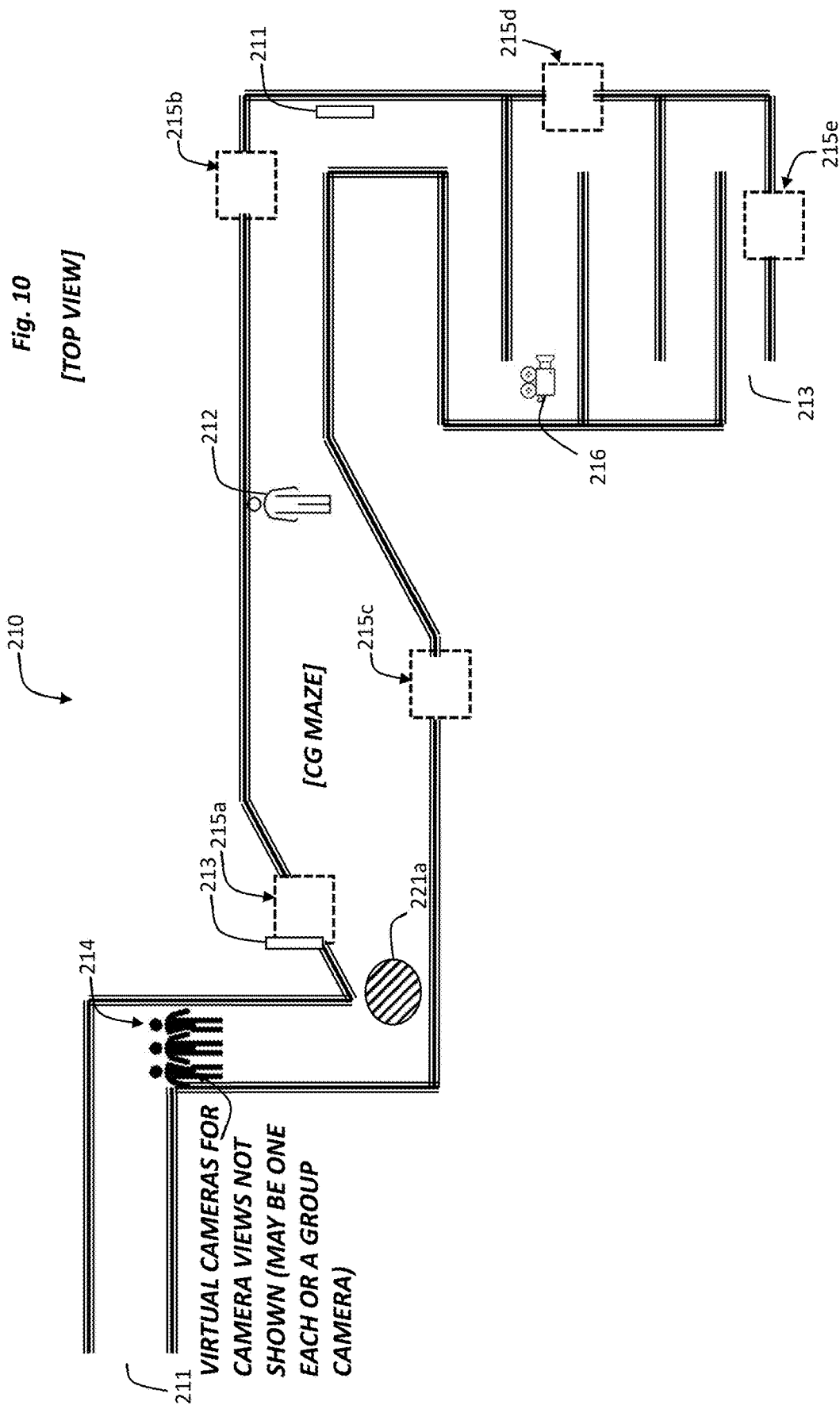
FIG. 10 shows a top view of another exemplary maze experience according to present principles, showing in particular a CG maze.

Another maze experience 210 is illustrated in a top view in FIG. 10, this one intended to illustrate a maze that is computer-generated. The same has an entrance 211, and an exit 213. Action pockets are shown, including pockets 215a-215e and a trigger area 221a. A group of patrons' avatars 214 is illustrated. What is not illustrated but will be understood is that each may employ virtual cameras to provide camera views of the CG maze. There may be one camera each, or they may each use the same camera, which may be termed a group camera. These are generally not actual cameras, but rather virtual cameras created by the system, e.g., server 131, or by the user computing environment, or by a combination. A single patron avatar 212 is also illustrated at another point in the maze (this avatar not being part of patron group 214). A further patron 216 is illustrated by a camera only, and here it is noted that patrons need not necessarily have an avatar associated therewith. If they do not have an avatar, they will generally be provided with some sort of mesh by the system so that the actor knows the location of the camera, and thus knows where to direct the interaction.

FIG. 10 also illustrates element 211, which is a video scene superposed atop the CG maze. Element 213 is an audio source, and the same may be the audio source used by the actor, particularly as the same is adjacent the action pocket 215*a*.

It is further noted that each element in this maze experience or environment may be kept track of by the associated computing environments including the server 131 by the use of game objects. For example, each avatar within the group pictured in 214 may be a game object, and each game object may be composed of multiple child game objects. Even empty game objects may be employed, although such often are employed to group together nonempty game objects. For example, an empty game object of "walls" may be employed to group together all of the game objects that form the walls of the maze. Game objects may further include menus and UI elements.

A CG environment is generally of a natural or man-made structure, e.g., a haunted house, corn maze, old hospital, or the like. But it can also be a CG re-creation of a person's locale, e.g., the home of the customer. Such can be created at runtime using cameras coupled to the HMD, for example, or such can also be created ahead of time, using known architectural visualization/digitization techniques. Procedural generation may also be employed, at runtime.

In more detail, CG environments may also be procedurally-generated, such that the same are generated shortly before a patron enters them. Such may be created before the patron or patrons begin a maze, or portions of the maze may even be created while the patron or patrons are in an earlier part of the maze, e.g., "on-the-fly". In some cases, some operators may desire that a patron or group of patrons take a constant amount of time to traverse an overall maze, e.g., 15 minutes, 20 minutes, 30 minutes, 45 minutes, an hour, and so on. In some cases though, patrons may vary in the speed in which they traverse the maze. In this case, procedural generation can lengthen or shorten the maze, to ensure that the patrons complete the maze in the desired time. In an alternative embodiment, the set time duration to traverse the maze may be based on the price paid for admission.

Figure 11:
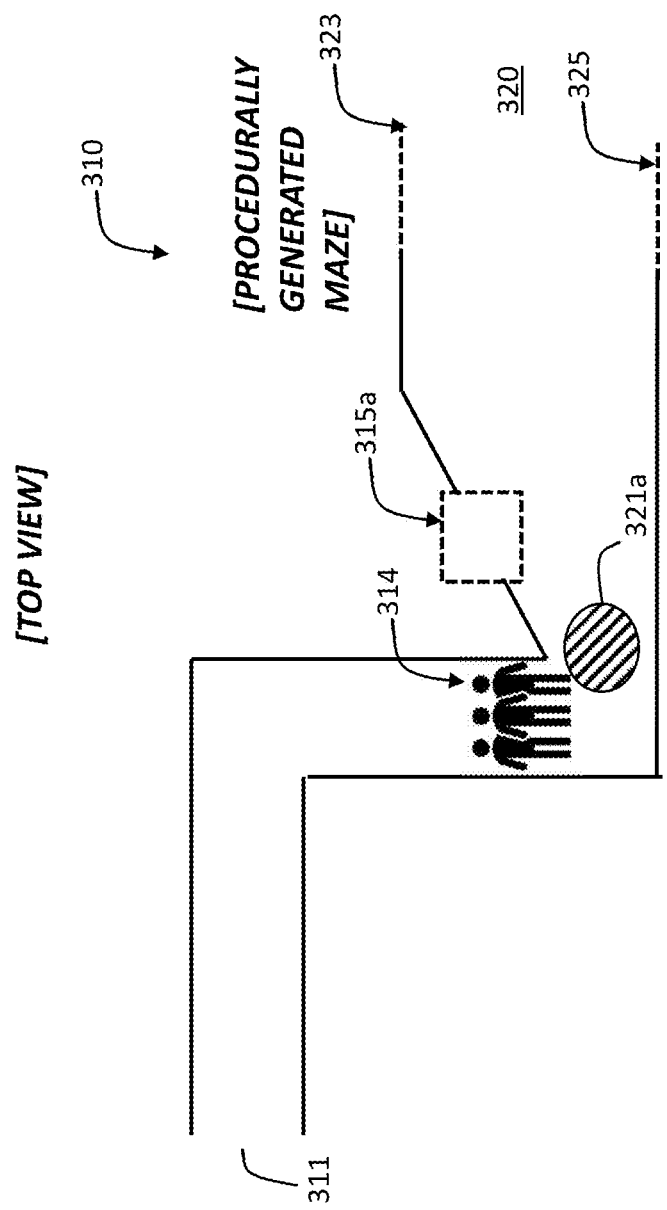
FIG. 11 shows a top view of another exemplary maze experience according to present principles, showing in particular a CG procedurally-generated maze.

A portion of a procedurally-generated maze is illustrated by the maze 310 of FIG. 11. At the point seen in the figure, the maze has an entrance 311, and a group of patrons' avatars 314 are about to interact (or have their collider(s) interact) with trigger area (or volume) 321*a*. This may then cause the instantiation of an entry on the actor interface employed by an actor, and upon appropriate activation of a link, the actor avatar may be instantiated within the action pocket 315*a*. But as this maze is procedurally-generated, it is only a small portion beyond the action pocket 315*a* that is actually created. This section is procedurally-generated section 320 with boundaries 323 and 325. The procedural generation can take place at various times, e.g., a section may be created whenever a patron or group of patrons encounters a trigger point, constantly over time, or the procedural generation can also be dependent on the speed of patron travel. Other ways to determine the speed of procedural generation will also be understood. As noted, procedural generation may be employed in some cases to allow a certain level of control over the amount of time a patron takes to traverse the maze. For example, a user's admission ticket may be good for a one hour maze. Procedural generation can be employed to ensure that the maze ends at the one hour mark. It will be understood that procedural generation would provide not only generation of maze environments but also trigger areas, action pockets or other actor instantiation points, nonplayer character (NPC) creation, such as monsters in the case of a haunted attraction, and the like. Such may be in turn employed to cause the instantiation of an entry on the actor interface.

In some cases, where a maze represents an actual locale, if the user is physically in the locale, the maze may be CG generated, or may have CG elements displayed on an AR HMD (more on this embodiment below), but the patron may traverse the same by physically walking through the actual locale and having the movements translated into movements in the CG version of the locale. In this case, it may be convenient to occasionally (e.g., every two minutes, five minutes, 10 minutes, and so on) operate the camera on the HMD for a short period of time (e.g., one second, five seconds, 10 seconds, 30 seconds, and so on) so as to allow a degree of calibration or alignment to occur between the CG maze environment represented in the computing environment, headset, server, or a combination, and the actual physical environment. This is because over time, HMD tracking may slip to a certain extent, and become not faithfully representative of the actual locale of the user. In a VR setting, this is problematic because such is the only view the user has their surroundings. If the slipped tracking no longer faithfully represents the surroundings, e.g., has shifted due to incorrect or inaccurate tracking, the user may end up running into a wall or tripping over furniture. Thus it may be important to occasionally operate the camera to allow a resynchronization/recalibration to occur.

Actual or Real

The environment may also be actual or real, and data pertaining to such an actual or real environment would generally be video data that is displayed within the HMD, particularly if the same is VR. An actual environment may also be portrayed or displayed in an AR HMD, as noted above, however, in many cases the same is superfluous as AR glasses already allow a visualization with perfect fidelity of an exterior environment. However, in some cases, the user may only have AR glasses but wish to be immersed in a different environment. In this case, the AR glasses may substantially act as VR glasses, and block out as much as possible of the scene other than certain elements within the scene desired to be visualized and displayed.

As noted, the environment may be actual or real, and in this case video data is displayed within the HMD. CG elements may be displayed atop or superimposed on top of the video data, and thus may serve the purpose of adorning the video environment so as to make the same appear more suited to the performances or interactions. For example, such adornments may constitute assets superimposed on the video so as to change the view of the displayed scene, e.g., changing a house to a haunted house, changing a hallway to a scary hospital hallway, and so on.

Where the environment is actual or real, patron movements within the environment have to be detected and represented. In some cases, if the patron has a large empty space available, or is within the re-created locale, the patron may walk and have their movements translated into movements in the actual or real environment. For example, the actual or real environment may be an environment portrayed by a video feed of a house, decorated, either physically or in CG, to be a haunted house. The patron may visualize a video of the haunted house, even though they are standing in a regular house or elsewhere, e.g., in a large open section of their driveway. Patron movements may be translated into movements in the haunted house. In some cases the movements may be one-to-one, where if the user moves 1 foot in the driveway they also move 1 foot in the haunted house. Alternatively, the user may be caused to move more or less then their accompanying and associated physical movements in the physical space. In another embodiment, the user may employ a joystick or other controller to facilitate movement. In yet other embodiments, accelerometers may be employed to detect movement, or other sensors such as may be employed on a, e.g., multidirectional treadmill.

To visualize what the user is seeing in the actual or real environment, various techniques may be employed. In one, if the actual or real environment is available for physical occupation, a camera on a robot, controlled by the joystick or user movement, may move through the actual or real environment, causing the change of view. Real or virtual actors may then perform to the robot. If real, the actor simply acts as if the patron were at the location of the robot or camera attached thereto. If virtual, either CG or a video representation, the visual data corresponding to the actor is overlaid atop or superimposed upon the camera view of the environment.

As noted, various CG elements may be employed to "dress up" the actual or real environment, to increase the sense of user immersion. Other ways of visualizing what the user is seeing in the actual or real environment, particularly as the view changes due to user movement, is through the use of light field cameras. A light field camera that has imaged a volume such as a room allows a faithful and true re-creation of a view from one or more other points in the room. Put another way, use of a light field camera allows a general or arbitrary view from a point in the room, such as a point chosen by a user through user movement or use of a joystick, to be re-created. In some cases, if a user moves into another room, another light field camera image can be subsequently loaded into memory and used for portrayal of the view in the room for the user. In the event that a more "traditional" 4 pi steradian or 360 degree or 180 degree camera is employed, the user may still experience a sense of immersion as they traverse through the maze, but it will be as if the user or patron is on a "rail", such that they can move along the rail but not in arbitrary locations within the room off of or away from the rail such allows 3-dof but not 6-dof movement, as described below. Of course, it will be understood that even in such "traditional" situations, multiple rails may be provided with appropriate branching points such that the user may move from one rail onto another using an appropriate user interface in their display, e.g., their AR or VR HMD or computer display, or using an appropriate user interaction caused by a a controller, keyboard, mouse, or the like.

Figure 12:
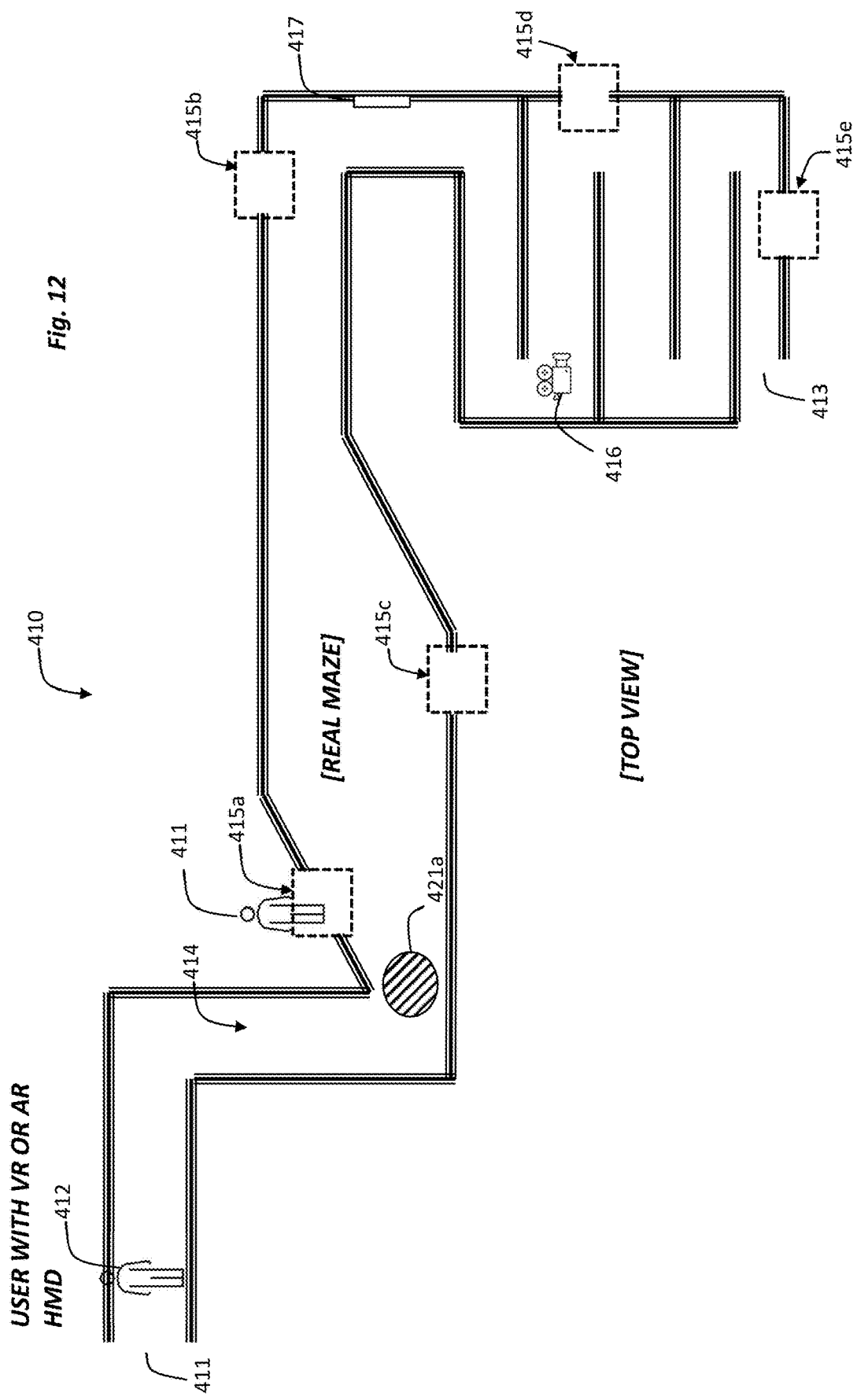
FIG. 12 shows a top view of another exemplary maze experience according to present principles, showing in particular a maze that is real, actual, or physical. Such a maze exists in the real world and a video or CG reconstruction of the same is employed to create a maze experience.

FIG. 12 illustrates a real or actual maze 410. The real maze 410 is an actual physical area, though CG elements may be employed as have been described. The maze 410 has an entrance 411 and an exit 413. A user 412 is pictured, at the entrance of the maze. After traversing the path 414, the user's avatar 412 will collide with trigger area 421a, which as noted will set in motion processing that will result in, at some point, an actor avatar 411 instantiating within the action pocket 415a. Other action pockets 415b-415e are also illustrated. An element 417 is shown, which is a CG element superimposed atop the real maze.

The real maze 410 may be imaged either directly, in video, or as a CG creation/construction or reconstruction. The same is generally displayed to the user using an associated HMD, e.g., a VR or AR HMD, or other display. FIG. 12 also illustrates an actual physical camera 416 operated under control of a robot that is negotiating the real maze 410 under control of a user. In other implementations, the user 412 can locomote either physically or virtually. If the user 412 is employing a VR or AR headset and locomoting physically through the locale, then the locale interior can be viewed actually (using AR glasses), as a CG reconstruction, or as a video feed. Other details are described above. If the user is locomoting virtually, then the user may or may not be embodied by an avatar, and in this case traversing the interior of the locale can occur in a number of ways. These are described in connection with Table I and throughout this specification.

In particular, Table I is an exemplary non-limiting list of various types of maze experiences along with corresponding type of environments and locomotion schemes. In the case of a virtual maze, which may be CG generated or video generated or both, generally no physical locale is present to actually traverse through, though the virtual maze can be based on a real place. However, there is generally no capture of the visual data about the place taking place in real time by the user walking through it. Layout data may still be obtained, however. In this regard it is noted that a common reason to have a real (also termed physical or actual) maze is so the user or a camera can walk or otherwise traverse through it. Generally or in many cases, if the user (either physically or via a real or physical camera) is not physically walking or otherwise traversing through the maze, it may reduce to the case above of a virtual maze, and this case is discussed above. And generally, if the user is traversing the maze, the user through an AR glass or camera or other such sensor (directly through AR goggles or indirectly through a video feed or realtime CG reconstruction) is receiving visual or layout data from the physical maze itself, in real time, as they are walking or traversing. The visual data may be of a hallway, room, field, and so on. Layout data may be data corresponding to location data, e.g., where the user is in the physical maze. This data may be generated entirely by the headset in the case of simply accelerometer data, or may be combined with other sensors, such as cameras or GPS or using monitoring of other locomotion data described herein. Generally, a purpose for traversing an actual locale but having the entirety (or most thereof) of the structure replaced with CG or vido elements is that the user may desire that their locale, e.g., house or apartment, be the environment for a maze experience, but they may desire that the entirety of their house or apartment be replaced with experience-suitable decor. Thus, a hallway of a house may be replaced with a hallway of a castle. A bedroom may be replaced with a throne room, and so on. In this way, if the user brushes up against a wall in real life, they will also brush up against a wall in the maze experience, thus significantly increasing the immersion.

Actor Visualization

Video

If a video of an actor is to be employed in the situation of a video of an actual or real or physical attraction or maze, in which the actor is physically in the maze, then no green screen is needed, as generally the video of the actor captures the video of the maze, or vice versa. In other implementations, the actor may be filmed separately, e.g., with a green screen. In other words, if the video of the actor is to be employed where the actor is outside of the attraction, then it may become necessary to use a green screen so as to extract the video of the actor from the remainder of the scene.

If video is used for either purpose, i.e., for either the maze or the actor (though more commonly the maze), then a light field camera may be employed to allow and enable the creation of the image (video image) of the scene, so as to allow arbitrary perspectives for the user. In particular, the light field camera may be employed to allow and enable the creation of the portion of the image created in video, which may then be superposed on any or all CG portions of the image, or vice versa. For the avoidance of confusion, here it is noted that the camera visualizing the maze for the customer need not be a light field camera, necessarily. It may be a camera such as a 180 or 360° camera, or the like, mounted on a robot controlled by the customer in real time, or it may be a 180 or 360° camera, or the like, that has been caused to move through the maze so as to capture initial visualization data, in which case the same is said to be operating (thereafter) on a virtual "rail", as described above, because its path is thereafter predefined to be that of its initial capture journey. However, in the case where prior video footage is employed, e.g., where a visualization of an actual maze is created but then this actual maze is not accessed again for real-time patron usage, then the use of a light field camera to obtain the prior video footage of the maze may be employed to allow the faithful re-creation of an image of this maze from any angle or location. This facility then allows the user to move around the interior of the maze and to see an accurate representation of the interior from any arbitrary angle or from any vantage point, again substantially increasing immersion.

Digitization

Three Degrees of Freedom

Some early VR headsets allow only three degrees of freedom ("3-dof"), and thus allow rotations of an actor's head to be portrayed, but not translations or longitudinal/transverse movements thereof. While less immersive for the user, such may still be employed to provide some level of interaction, e.g., scares, particularly where the actor does not need to approach or appear to come closer to the user or patron as part of the interaction. Longitudinal or transverse movements may still be accomplished by way of the actor using a joystick or other technique in which longitudinal or transverse motion data may be entered into the system employed by the actor. It is noted that what is being discussed here is the headset worn by the actor, in some implementations, to allow movement of the actor's head, to allow the actor to move towards the patron as part of the interaction. The user similarly may also be wearing a VR or AR headset, to increase their immersion, but such is unrelated to the use of a headset on the actor to detect actor head movements and translate the same into movements of the actors avatar as part of the interaction. But similarly, a user employing a 3-dof headset may rotate their angle of view about three axes, but generally cannot move their head view relative to the location of the view in a transverse or longitudinal direction, without a separate movement system or means, e.g., a controller with a joystick. In the same way, when the view is from a virtual camera on a rail, such movements are generally prohibited unless multiple rails are provided. It is noted that 3-dof headsets may also employ controllers for use by each of the user's hands, and such may be employed not only for input but also to visualize the user's hands. Alternatively, cameras may be employed to visualize the user's hands. In either case, the controllers may be worn to allow inputs by the actor into the actor interface described elsewhere.

Six Degrees of Freedom

Newer VR headsets generally allow for six degrees of freedom ("6-dof"). In this case, longitudinal and transverse movements in three dimensions can also be detected and portrayed as actor movements, along with the three axes of rotation of a 3-dof system. As noted above, controllers or cameras (either external or mounted to the headset) can be employed to image hands and cause the display of user hands. 6-dof can also imply upper body movement, because if the head is moving, it is generally moving at least the upper body in a predictable and representable direction, i.e., moving the head often involves moving the upper body along with it. Exemplary lower body movements can be implied based on upper body movements, although such are generally somewhat more disconnected and unrelated from the movements of the upper body. For particularly advantageous motion capture however, suits imaging the entire body or a portion of the body may be employed to more faithfully capture the movements of the actor, and allow a particularly advantageous representation of actor movement as a corresponding avatar movement for the display and enjoyment of the patron or patrons. In some cases, controllers may be used for hands and upper body, and other motion tracking may be employed for the lower body, e.g., through motion tracking shoes or other lower body articles of clothing. In this way the entire body can be motion tracked.

In addition, while it is noted that cameras may be employed to visualize the controllers or user hands or portions of bodies or even entire bodies, other sensors may also be employed for this purpose, particularly including accelerometer sensors, e.g. for the detection of relative movements (movements relative to an initial position, but where absolute positions in space may in some cases remain unknown).

Patron/User/Customer Movement

Users can move under actual movement if enabled under 6-dof, or they can use a joystick. In the first case, users may walk through a large open space, and their movements can be recorded by cameras and employed to cause movement in an associated CG space or environment, which is also termed a "common environment" if multiple users are involved. Instead of a large open space in which the user traverses, alternatively, a multidirectional treadmill may be employed. The cameras may either be external to the user within the space, or the cameras may be mounted on the HMD and detect relative movement and use the same to cause corresponding movement in the CG environment. Where a multidirectional treadmill is employed, the degree and direction of movement may also be drawn from sensors in the treadmill, from a pedometer worn by the user, from cameras imaging gait, and so on. Where a joystick is employed to cause movement, patrons may be stationary, seated, and the action of the user-operated joystick may cause the movement to appear in the CG space. Additional details are described in Table I.

A group of customers can be slowly automatically moved through a desired path (on a 'rail') so as to ensure throughput thru the maze. Even if on a rail, the users may be enabled to move locally (such as within a defined area) while the defined area is moved along the rail or other such predefined path. Thus, users can move within the defined area but can be prohibited from moving off of the defined area. In some cases, customers can be prohibited from backward movement so as to not cause issues with the actor trigger system described elsewhere. That is, it may be generally desired in some embodiments that users approach actors from a particular direction, and a user moving backwards may end up approaching the action pocket before hitting the trigger, and in this case the actor may be unprepared for any interaction. In addition, it is well known in haunted attractions that it is desired to "scare the patrons forward", through the maze, rather than backwards, where they may encounter other patrons.

Where a defined area is moved along a rail at a particular pace, the operator of the themed attraction or maze may be enabled to almost "dial in" how much revenue is desired, and may simply move patrons along at a speed that allows a certain rate of revenue to be received on a per hour or per day basis. For example, in one calculation:

$$\text{Dollar\_Revenue}/\text{hour} = \$\text{Admission\_Price} * \text{Customers}/\text{hour}$$
$$= \$\text{Admission\_Price} * (R/D) * \sum N_i$$

Where R is the speed of the defined area, D is the length of the maze, and $N_i$ are the number of patrons in each group. The sum is over all of the groups in a particular hour.

EXAMPLES

VR Haunted Attraction

Similar to that displayed in FIG. 7A, a maze may be created using computer graphics and known 3D modeling techniques, and so-called scare actors may be situated within scare pockets to jump out and scare patrons as patrons traverse through the maze. The actors may be notified of when patrons are arriving by way of the trigger areas described above. One actor may be enabled to jump between multiple scare pockets so as to allow that one actor (or a subset of actors using multiple actor interfaces) to provide multiple interactions within the maze. The one actor may employ different avatars, however, to change their appearance and thus make it appear that it is different avatars that are appearing in each action pocket. Moreover, while typically a scare actor would employ their own voice, such may be modulated (or not) to further allow the actor/avatar to appear differently than they did before. For example, an actor's voice may be modulated down to approximate zombie groans or modulated up to sound more like a "bride of Frankenstein" character.

AR Home Haunt

In some implementations this example may provide the most intense scares. A user has AR glasses (also variously termed herein as goggles or a headset or an HMD) and traverses their home, while the system analyzes the view of the interior of the home for the presence of doors, hallways, cabinets, alcoves, or the like. Being based on a video feed from the viewpoint of the user, such are detected from the standpoint of the user or customer. Such may then be analyzed as being potential locations for patron/actor interactions, e.g., scares, at least from the aspect of a jump scare or startle scare. The system may detect these areas, create a virtual scare pocket, and the avatar of the actor may be caused to occupy the virtual scare pocket, i.e. may be caused to instantiate within the action or scare pocket using the actor interface, such that the actor avatar is not visible from the standpoint of the camera representing the viewpoint of the patron (e.g., patron's avatar). When the patron is adjacent or near the virtual scare pocket, and some implementations having activated a trigger in a trigger area or volume, the actor may cause the avatar to emerge therefrom in a sudden fashion, scaring the patron.

In a particularly convenient implementation of the above, as the patron traverses the environment (e.g., home or other real/actual setting/location), as noted the algorithm analyzes the view of the setting/location for the presence of doors, hallways, cabinets, alcoves, or the like. Such are detected from the standpoint of the user or customer. Such may then be analyzed as being potential locations for patron/actor interactions, e.g., scares, at least from the aspect of a jump scare or startle scare. The system may detect these areas, create a virtual scare pocket, and the avatar of the actor may emanate from such a virtual scare pocket after being instantiated therein. However, as the only data in the computing environment is from the point of view of the patron, it may be difficult for the actor controlling the avatar to properly provide a performance (e.g., scare) towards the patron because there exists no visual data, e.g., the actor has no camera view, towards the patron. Thus, the system may, for the benefit of the actor, invert the view in create a virtual view from the point of view of the instantiation point of the actor avatar, such that the actor has a direction in which to direct their performance.

Figure 15A:
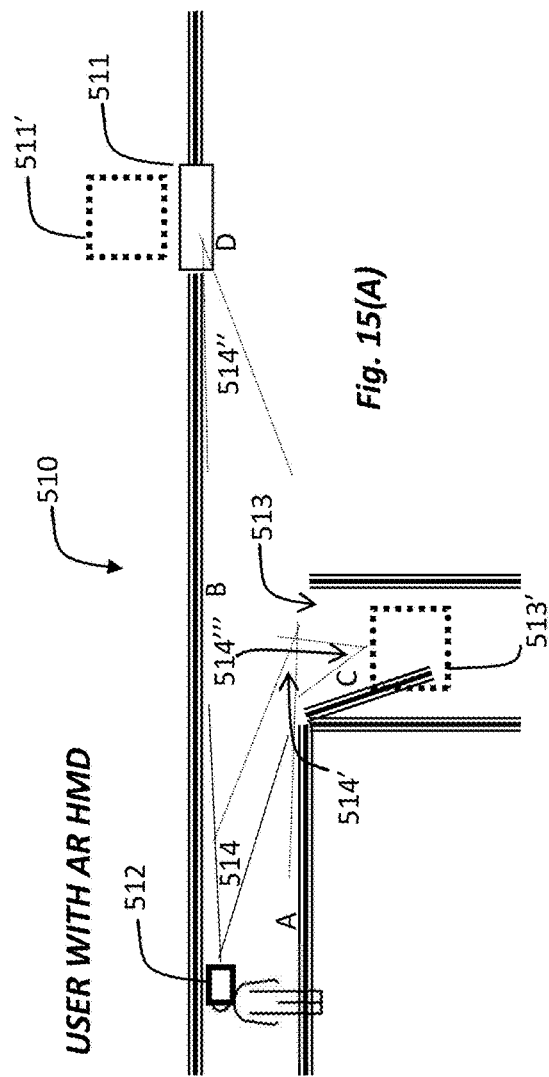
FIG. 15(A) shows a portion of a real maze with a user traversing the same using an augmented reality headset/glasses.

Referring to FIG. 15(A), a patron is shown using an augmented reality HMD 512. The patron is traversing a maze 510. An actual or real window 511 and doorway 513 are present in the maze 510. The computing environment associated with HMD 512 identifies these as potential scare pockets, and may thus create, within the computing environment, virtual scare pockets associated with these areas. These scare pockets are shown as 511' and 513'.

The HMD 512 has a field of view 514. The computing environment may invert this field-of-view to an actor field-of-view 514', shown in FIG. 15(A) and further indicated by dotted lines. The inversion can be done using data about the location of the detected door (and thus location of potential scare pocket), as well as the distance between the HMD 512 and the location of the detected door as well as the detected locations of other elements visualized by the HMD 512. The inversion can create a view for the actor that is looking back towards the HMD 512. This view can include CG reconstructions of elements that are in the field-of-view 514', and even a CG reconstruction of the HMD 512. Of course, some elements that would have been viewable by an actual actor in the location of the virtual scare pocket 513' will not be capable of being reconstructed with CG elements and provided in a point of view 514'. For example, walls A and B and window D are capable of being reconstructed in the view of the actor avatar, while only a portion of the door C is capable of being reconstructed because the majority of the same is not viewable by the HMD 512. The inversion may occur using known techniques, but the inventor believes it is at least not known to perform the inversion and substitute CG elements for one or more inverted elements. It is further noted that while the term "inverted" is used here to mean a reconstructed view (reconstructed using at least some CG elements) based on an actual view, it is not necessary that it be a 180° inversion. Rather, the term is simply employed to mean a view from a different angle or point of view, and in many cases here is intended to mean a view from an instantiation point such as a scare pocket. Also shown in the figure is a field-of-view 514" from the window D.

Moreover, it is not necessary that the origin of the field-of-view be a point that is, itself, within the field-of-view 514. For example, if a distance is known down the hallway 513, it may be possible to offset the field-of-view to create a field-of-view 514''' to create a more realistic view for the actor avatar virtually situated within the scare pocket 513'. And the reconstruction of the field-of-view can operate on a sliding scale, such that the same employs more of the view from the HMD 512 as the actor avatar moves from the position of the scare pocket 513' towards the wall B and/or towards the patron and HMD 512.

As before, when the patron is adjacent or near the virtual scare pocket, or whenever the actor desires to perform the action (and some implementations where the user or patron has activated a virtual trigger in a trigger area or volume defined by the system, i.e., the computing environment associated with the HMD 512, which may be an integrated computing environment), the actor may cause the avatar to emerge from the scare pocket in a sudden fashion, scaring the patron.

Figure 15B:
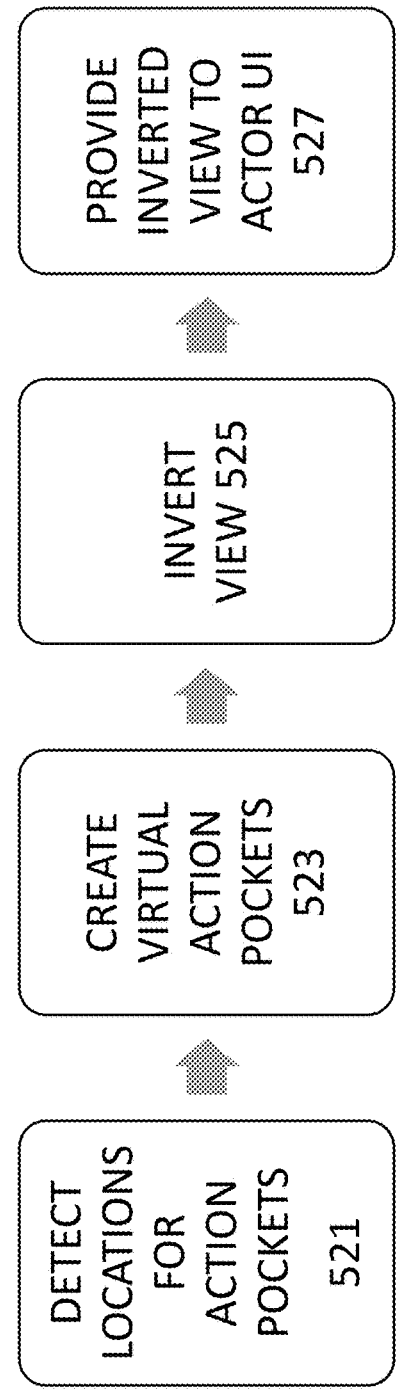
FIG. 15(B) shows a flowchart of a method that may be operated by a computing environment coupled to the augmented reality headset/glasses of FIG. 15(A).

FIG. 15(B) indicates an exemplary flowchart of this procedure. First, locations are detected using the AR HMD for action pockets (step 521). In some cases, other data besides that from the AR HMD may also be employed, such as previously known location data, camera data from other external cameras, and so on. A next step is that virtual action pockets, e.g., scare pockets, are created (step 523). Of course, these are created virtually in the computing environment running the application. One copy of the view from the HMD is then inverted (step 525). This inversion step can also take advantage of other sources of visual data as noted above. In any case, a view is created for the actor, such that the actor knows where to direct his or her performance. It is not vital that this view be of any sort of photo quality. It can simply be a wireframe view that indicates the HMD of the patron. But it should provide some geometry such that the actor has some sense of the environment in which to direct their performance. The view is then provided to the actor UI (step 527). It can be provided to the UIs of the actor can get a better physical sense of where the patron is in the environment. But it can also be provided to the HMD or other display employed by the actor when the same is controlling the actor avatar, again so that the actor has a better sense of where to direct their action.

In the case where a light field camera has been used to capture data about the maze, the view from the action pocket or instantiation point can be directly created from the data from the light field camera, without resort to the process of inverion of view. Alternatively, a combination of inversion and data from the light field camera can be employed. Where some data from a light field camera is available for certain locations within a maze, great use may be made of such data for reconstruction or simulation of views of those certain locations. The system can employ a sliding scale as well, making less use of such data where such data is not available, and more where it is. In some case, LIDAR may be employed to garner some color and depth information (particularly the latter, and in some cases color information can be gathered from a regular camera), and such may be employed to reconstruct the maze for display or simulation. This may be particularly useful when the AR device has LIDAR capability, e.g., the iPhone 12 Max and the like. LIDAR capabilities may be employed to capture maze information prior to a user traversing the maze, and such constitutes a preprocessing step. In general, in such systems, the AR device can capture data in real time, e.g., with a video feed or the like, and the system may process such data in real time, detecting action pockets and populating/instantiating actors/actor avatars in those pockets. Alternatively, the system may preprocess location data, either from a user walking through the same with a LIDAR equipped camera or even just a regular camera, where visual analysis is employed to determined where action pockets may be placed. In some cases, camera movement itself may be employed to determine maze geometry. For example, 6 dof data may be employed using cameras and/or GPS or accelerometer data and the same may be used to determine how long a hallway is, by the movements made by the user when traversing the hallway. Again, a combination of such data, using an optional sliding scale for weighting due to best known data or that with the highest confidence level, may be used to reconstruct or simulate maze environments.

Figure 16:
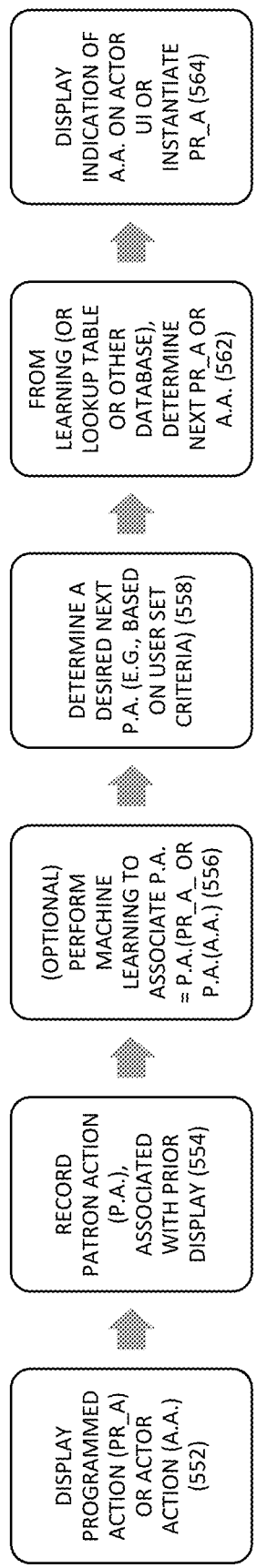
FIG. 16 shows a flowchart of a method that may be operated by a computing environment.

Referring to FIG. 16, one implementation of a method for employing, e.g., machine learning, is shown in flowchart form. In a first step 552, a programmed action (PR_A) or actor action (A. A.) is displayed. The programmed action may be implemented via a programmed CG animation, or may also be a recording of a prior actor action. The response to the same is termed a patron action (P. A.), and the same is also recorded in a next step (554). The data recorded may be, e.g., speed and distance data, e.g., if the patron jerked to the left a distance of between 0.5 ft and 2.0 ft, in a time period of between 0.25 and 0.75 seconds. Such may be stored in a table or array or database, but such may, once enough data is obtained and associated with a particular patron P, be used to perform machine learning (556) to associate particular patron actions with the applied stimuli (PR_A or A. A.). A desired next patron action may then be determined based on user criterion(ia) (558). For example, if it is known that the user wants a scary experience, this may be determined to be consistent with a large or powerful patron action, and PR_A or A. A. that lead to (or are associated with) such large or powerful patron actions may be selected or determined (562). Similarly, if it is known that the user wants a mild experience, this may be determined to be consistent with a small or less powerful or less vigorous patron action, and PR_A or A. A. that lead to (or are associated with) smaller patron actions may be selected or determined (562). In some cases, the data about patron actions may be employed to determine subsequent actor actions, in some cases to particularly startling effects. For example, if the result of a A. A. that occurs to the left of the patron is known to send the patron in a direction to the right, then the system may learn this aspect and first instantiate an action pocket to the left of the user, but also prepare an actor, via the actor interface, to appear and/or be instantiated in an action pocket to the right of the user. Essentially the actor to the left causes an initial A. A., sending the patron off to the right. The actor associated with the action pocket to the right of the patron then "receives" the patron in his/her direction, and performs the subsequent A. A. In some cases, such may provide a particularly intense effect for the patron.

In any case, an indication of the A. A. or the PR_A is then rendered or displayed (564). For the A. A., the indication may be rendered on the actor interface. For A. A. that are subsequent A. A., an indication of the initial A. A. may be displayed, such that the actor becomes aware of a very imminent action that may soon be needed to be performed. In the case of a programmed CG animation or the recording of a prior actor action, the same may simply be rendered to the user in known fashion.

It should be noted that while use of machine learning is described here in the context of an AR environment, the same may be employed to enhance the action of any of the embodiments described in the specification. For example, the same may be employed in an entirely CG maze, a partially CG and partially real maze (which would typically employ an AR headset), or the like.

Other, Including Haptics, Sound, and Programmed Actions

Besides the patron, user, or customer visualizing the actions of the actor as portrayed by a video or a CG avatar, the user or customer may "feel" the actions using forces or vibration from a haptic device such as a haptic glove, haptic vest or haptic bodysuit. A certain level of haptic forces or other interactions can be enabled on, e.g., VR or AR controllers or a game controller. This can increase the level of immersion somewhat, and the use of a haptic device such as a vest or bodysuit can increase the level of immersion even more. Appropriate permissions may be provided by the user or customer upon signing up for the themed attraction so as to provide permission (or not) for the actor's movements to cause transmission of haptic feedback or haptic motions through the haptic device. In certain cases, if desired, the patrons may be enabled to cause haptic forces on the actors, if the actor is similarly provided with a haptic device.

Sound and lighting are key features of many performances, including haunted attractions, and the same may be adjusted to either increase or decrease the scare level. For example, additional lighting may be employed to reduce a scare level. Strobe lights or other effects may be turned off as part of the user introductory settings interface in order to reduce the deleterious effects such may have on causing seizures or the like.

As noted with regard to buttons 279 in 281 of FIG. 8, certain actions of the actor's avatars can be preprogrammed in the sense that the actor need only push a button to cause a particular visual or audio effect, e.g., a popping of the eyes or a scream or a jumping movement. However, in most cases it is desired to have some personal human movement behind the actor, even if just the choice of when to cause such actions, so that the patron is always aware of the unpredictable nature, thus significantly increasing the scare factor.

Figure 13:
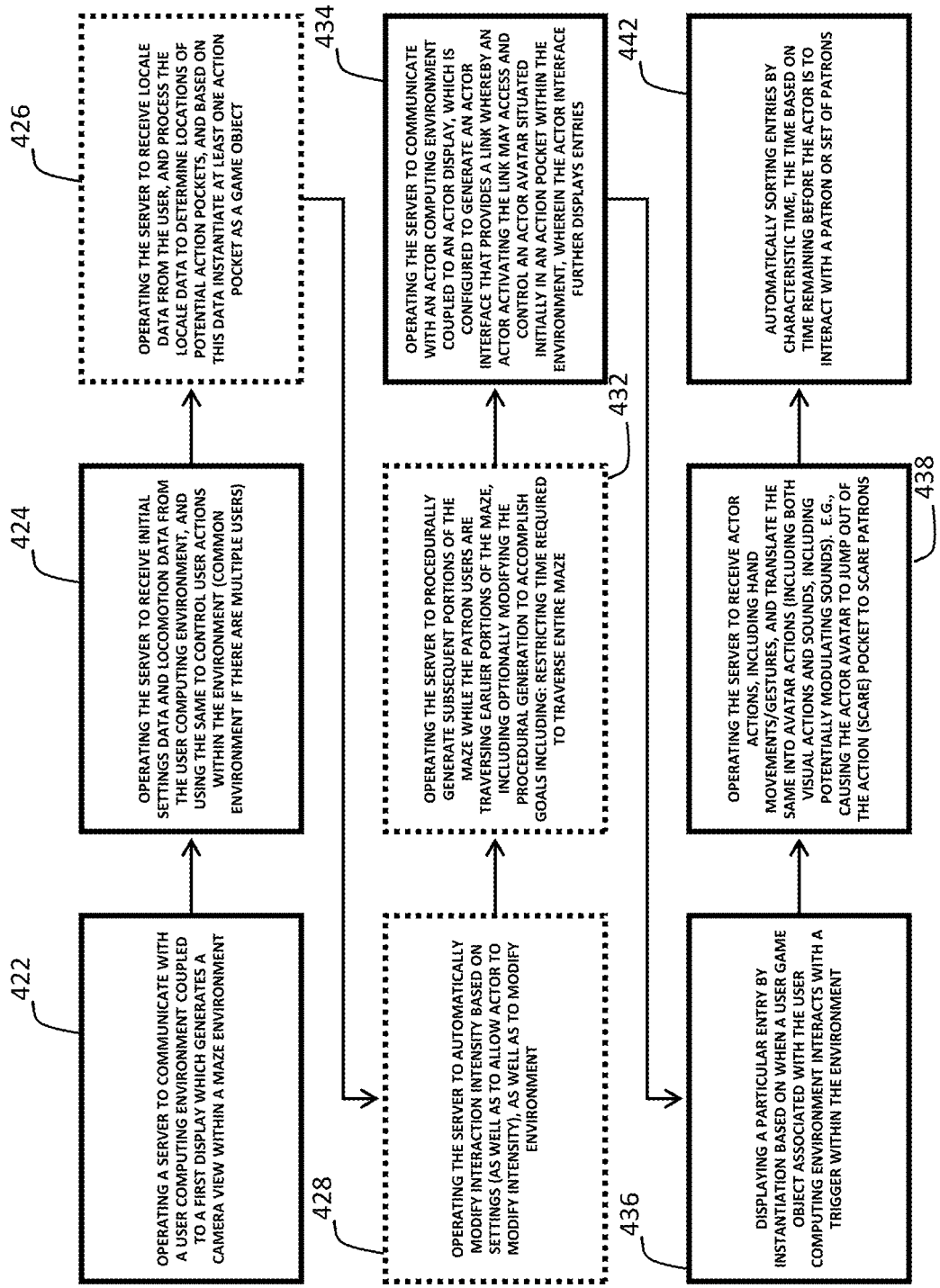
FIG. 13 is another flowchart of a method according to present principles.
Figure 14:
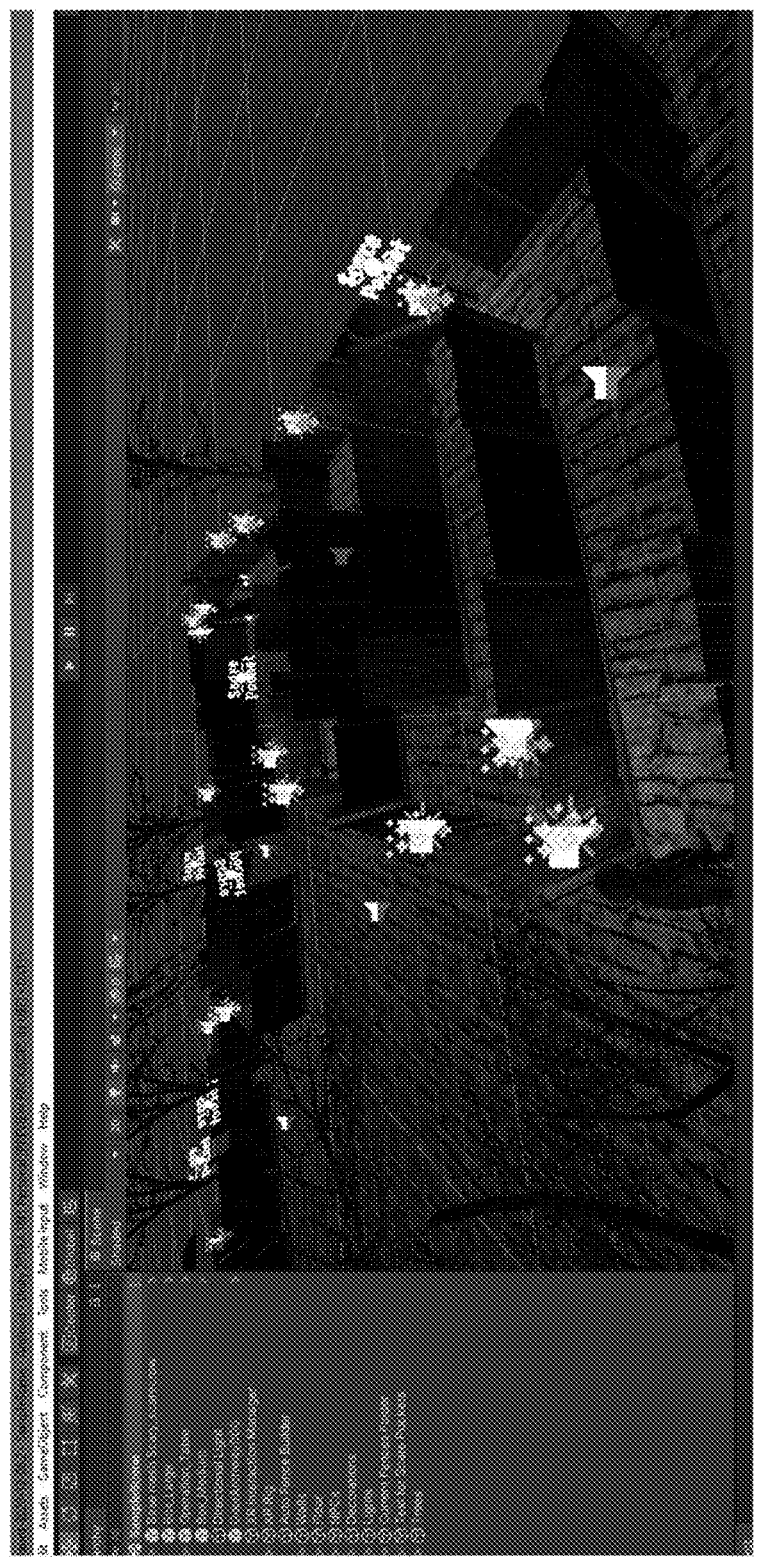
FIG. 14 shows a screenshot of an interactive maze with action/scare pockets according to present principles as developed within the Unity game engine.

FIG. 13 illustrates a flowchart of a general method of the invention. In a first step, a server may be operated to communicate with the user computing environment coupled to a first display which generates a camera view with a maze environment (step 422). The server may then be operated to receive initial settings data as well as locomotion data from the user computing environment, and the server may use the same to control user actions within the environment (step 424). The environment may be termed a common environment if multiple users are employed. The server may then be operated, in an optional step, to receive locale data from the user, and to process the locale data to determine locations of potential action pockets (step 426). Based on this data, an action pocket may be instantiated as a game object.

In yet another optional step, the server may be operated to automatically modify interaction intensity based on user-entered settings, and may further modify the environment based on the same settings (step 428). Actors may be enabled to modify these levels as well, using the actor interface or other such.

In yet a further optional step, the server may be operated to procedurally generate subsequent portions of the maze while the patrons are traversing earlier portions of the maze (step 432). This step may include optionally modifying the procedural generation to accomplish goals including maintaining a relatively constant amount of time for patron traversal of the entire maze experience.

In yet another step, the server may be operated to communicate with an actor computing environment coupled to an actor display, which is configured to generate an actor interface that provides one or more links wherein an actor activating the link may access and control an actor avatar (step 434). The actor avatar may be situated initially in an action pocket within the environment. The actor interface may further display one or more entries, each entry corresponding to a patron or group of patrons.

In a next step, a particular entry may be instantiated based on when a user game object associated with the user computing environment interacts with a trigger within the environment (step 436). For example, if a patron avatar (game object) having a mesh or other collider component is detected to collide with a volume representing a trigger volume, then the entry may be instantiated on the actor interface.

The server may be operated to receive actor actions, including hand movements, and to translate the same into avatar actions, including both visual actions and sounds (step 438). For example, these actions may be caused by the actor and may cause the actor avatar to, e.g., jump out of the action or scare pocket to scare patrons. In yet another step, the entries in the actor interface may be automatically sorted by characteristic time, which may be a time associated with a time remaining before a particular actor is to interact with a particular patron or group of patrons (step 442).

Other Aspects

Various terms have been employed in this description with adjectives such as "real", "actual", "virtual", "physical", "nonphysical", and the like. Generally, terms such as real and actual and physical refer to items, structures, buildings, cameras, and so on, that exist in real space and that can be handled or traversed by a human. Terms such as virtual generally refer to items, structures, buildings, cameras, and so on, that exist, but exist as digital constructs in databases, occupying memory identified by storage addresses, in the same may be stored in hard drives, tape drives, solid-state storage devices, RAM, ROM, CD-ROM, DVD, DVD-ROM, and so on.

In other variations, while it is noted that the term "action pocket" has been employed herein, there need not be a separate location in the virtual or actual maze identified by such a term. In some cases, an actor may simply be caused to appear at instantiation point as controlled by the link on the user interface, and the instantiation point may be within an action pocket, within the maze itself, at an interface between the two, and so on.

Chat functionality, either via a text box or via party chat, may be employed, so that patrons in a group can talk to each other. In addition, the chat functionality can be employed in such a way that the actor is added to the party group at the time of actor avatar instantiation into the maze or at an associated time, e.g., when the patrons are adjacent in action pocket or within a predetermined distance of the actor, such that the patrons can hear actor utterances. In this case, it may be preferable to obfuscate or otherwise obscure the existence of the actor in the chat channel. Alternatively, the actor may vocalize an utterance and all patrons within the maze may be enabled to hear, although in some cases the sound will be attenuated by virtual distance. 3D audio sources can accomplish this directionality and tapering/drop-off. In other cases, the actor may have control as to what patron or group of patrons can hear vocalized utterances. In yet other cases, a custom system may be employed such that an instantiated avatar may vocalize utterances and be heard by party members outside of the chat channel functionality.

In another variation, the actor interface can allow the actor to custom select which maze and action pocket (or instantiation point) to instantiate at using the noted links.

Where avatars have become more widely used and where a user can use an avatar for multiple apps or applications, their desired avatar may be employed for purposes of populating the maze, or they may be provided an avatar, which may be customizable as noted above. In some cases, if a user adopts a particular avatar or clothing for their avatar, such may be noted in the server 131 and further noted in the actor interface and caused to automatically have an influence on actor actions, interactive experience or interaction intensity, and so on. For example, if a patron wears a particular theme of costume, e.g., a Victorian-themed costume, the actor avatar may adopt an analogous appearance, e.g., may appear in analogous clothing, or may appear as a Victorian character such as Jack the Ripper, instead of, e.g., a crazed clown.

In yet another variation, in the event of a bad connection (generally determined by a diagnostic test which can be administered before or during the maze interaction or experience) the system may automatically switch to a next available actor, also employing a corresponding actor interface.

In another variation, the system may populate the actor interfaces based on load-balancing, so that the average amount of "characteristic time" is maximized or equalized (or both) between all the actors.

In another variation, machine learning may be employed to inform actor movements. In particular, feedback can be obtained in be used as source of data from the user computing environment. This feedback can include jerk movements and distance movements to indicate which programmed actions and/or which actor actions had the biggest effect on the patron, e.g., scared the patron the most, as evidenced by how much the patron moved (as determined by 6 dof data from, e.g., an accelerometer in the HMD). Such can be employed to either increase subsequent scared or decreased subsequent scares. Similarly, if a particular scare from a particular direction assaulted in a patron movement in a particular response direction, a similarly directed scare in a subsequent interaction may be followed up with yet another scare in the direction where the patron is expected to move based on the prior movement. This can increase the level of interaction, e.g., the level of the scare. These machine learning aspects can be provided on the actor interface as may be determined by the system.

It is noted that certain other terms have been used, and while definitions are not intended to be limiting, it is noted here that the term "teleportation" is intended to mean a variety of locomotion within VR or AR (or certain other computer application modalities concerning virtual environments) where a user is enabled to point at a location using a controller or their finger or joystick or other indicator and to immediately have their avatar transported to the location pointed at. In addition, terms such as "AR glass" is intended to mean a partially see-through display or window (which may be constituted of glass, plastic, a combination, or the like) which allows a user not only a view of an external environment but also data visualizations like) where visualization elements may be overlaid atop the environment, where the visualization elements may be CG, video, or the like. AR glasses may be employed by actors, patrons, operators, and so on.

In one aspect, the invention is directed towards a system for providing a virtual reality experience, including: a set of motorized pads for coupling to respective feet of a user; a means of communication between the set of motorized pads and a computing environment operating a virtual reality headset; such that the set of motorized pads are configured to provide pressure on a user's feet as an avatar within a virtual environment traverses the environment.

Implementations of the invention include one or more of the following. The means of communication may be an RF link or a wired link. The avatar may be a player character in a videogame or a character in a virtual tour. The set of motorized pads may include a left pad and a right pad, corresponding to a user's left foot and right foot, and the set of motorized pads may be configured to provide pressure on the user's left foot as an avatar within the virtual environment steps down on the environment with their left foot, and where the motorized pads may further be configured to provide pressure on the user's right foot as an avatar within the virtual environment steps down on the environment with their right foot.

In another aspect, the invention is directed towards a method of providing a multiuser virtual reality experience, including: configuring a server to communicate with a first user computing environment, the first user computing environment coupled to a first virtual reality headset, the first user computing environment configured to generate a first avatar corresponding to the user, the first avatar situated within a common environment viewable in the first virtual reality headset; and configuring a server to communicate with a second user computing environment, the second user computing environment coupled to a second virtual reality headset, the second user computing environment configured to generate a second avatar corresponding to the user, the second avatar situated within the common environment viewable in the second virtual reality headset.

Implementations of the invention may include one or more of the following. The method may further include configuring the server to allow the first user to provide a tour to the second user. The configuring the server to allow the first user to provide a tour to the second user may include configuring the server to cause the second avatar to automatically follow the first avatar as the first avatar moves within the common environment. The server may be a social networking server. For example, where the server is a server of a social networking site, the same may allow the first user to indicate entries on a social networking page corresponding to the first user, and to provide audio commentary before, during, or after, the indication. The tour and the audio commentary may be recorded for later playback. The indication of entries may be via the first avatar pointing at an asset corresponding to the entry. The entries may include textual entries, audio entries, photographic entries, or video entries. The method may further include receiving an asset from a third-party source distinct from the social networking page corresponding to the first user, and configuring the server to allow the tour to include the received asset.

In another aspect, the invention is directed towards a non-transitory computer readable medium, including instructions for causing a computing environment to perform the above method.

In another aspect, the invention is directed towards a method of providing a multiuser virtual reality experience, including: configuring a server to communicate with a first user computing environment, the first user computing environment coupled to a first virtual reality headset, the first user computing environment configured to generate a common environment viewable in the first virtual reality headset; and recording a tour including audio data as the first user describes the common environment.

Implementations of the invention may include one or more of the following. The server may be a server of a social networking site, and the common environment may include visual depictions of entries from a social networking page corresponding to the first user, and the method may further include configuring the server to allow the first user to indicate the entries and to provide audio commentary before, during, or after, the indication.

While haunted mazes have been the subject of much of the discussion here, it will be understood that other experiences may also be used, including theatrical experiences, educational experiences, such as "Open Houses" or "Back-To-School Nights" or other situations, including "regular" school experiences, where groups of users traverse from one location (e.g., classroom) to another, where the users are parents or students and the "actors" are teachers or administrators. In this case a user colliding with a trigger would indicate a student or parent arriving at the classroom, and this may then indicate to the teacher that they should get ready to begin their lesson or other presentation. In the theatrical area, the patrons may traverse CG recreations of scenes of plays, musicals, or operas, and the actors may play out their scenes as the patrons arrive adjacent the action pockets or instantiation points associated with trigger areas.

General

The system and method may be fully implemented in any number of computing devices. Typically, instructions are laid out on computer readable media, generally non-transitory, and these instructions are sufficient to allow a processor in the computing device to implement the method of the invention. In more detail, the server 131 may be employed to operate the steps described within this specification and claims with appropriate programming as embodied by instructions stored on a non-transitory computer readable medium and which are used to operate a programmer in a computing environment. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or wi-fi—connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where actors or performers within a maze are contemplated, the plural inputs may allow plural users (either plural actors or plural patrons or both) to input relevant data at the same time.

While the invention herein disclosed is capable of obtaining the objects hereinbefore stated, it is to be understood that this disclosure is merely illustrative of the presently preferred embodiments of the invention and that no limitations are intended other than as described in the appended claims. For example, the invention can be used in a wide variety of settings, e.g., in the applications of theater, haunted attractions, themed attractions, mazes, and so on.

TABLE I

| Types of Maze Environments (Experiences) | Subtypes of Virtual Mazes | Subtypes of Virtual Mazes (if any) | Types of Locomotion | Subtypes of Locomotion |
|---|---|---|---|---|
| Virtual Maze (AKA artificial, non-physical) AKA artificial, non-physical. in this, | CG Generated | | Controller, joystick or other keyboard control | Teleportation (user with controller/joystick pointing at desired location. Continuous movement |
| | | | Actually walking traversing a distance, and detecting traversal (e.g., in a large room, room scale VR, and soon.) | Cameras Accelerometers, e.g., pedometer GPS |
| | | | Actually walking but not traversing a physical distance, and detecting an amount of distance that would have been traversed | Accelerometers, e.g., pedometer Multi-directional treadmill with sensors indicating effective distance traveled. Cameras or sensors to measure walking-in-place with gait analysis and thus effective distance travelled |
| | Video Generated | Light field camera 180/360 degree camera on a (virtual) rail or with multiple rails | Same as above | |
| | Combination of CG and Video | Mostly video with CG elements Mostly CG with video elements added | | |
| Real Maze | User physically walks through maze | AR: glasses or similar HMD view environment; CG or video components may be overlaid, including actors/action pockets | Actually walking traversing a distance, and detecting traversal (e.g., in a large room, room scale VR, and so on.) | AR glass Cameras to detect and translate movement |
| | | VR (In either case CG or video components or both can be overlaid on | Through pass camera employed to visualize environment, at least in part | | Accelerometers, e.g., pedometer, to detect and translate movement |

TABLE I-continued

| Types of Maze Environments (Experiences) | Subtypes of Virtual Mazes | Subtypes of Virtual Mazes (if any) | Types of Locomotion | Subtypes of Locomotion |
|---|---|---|---|---|
| | | environment, including actors/action pockets. | Environment could be completely CG or video generated (or a combination) (using structure geometry but replacing appearance) | | GPS, to detect and translate movement |
| | Instead of user, physical camera traverses maze | In this case the user may in some cases employ a VR HMO that is receiving a 180° or 360° camera view of the maze, Robot could be under control of the user or could operate along a set path. While a light field camera may be employed, there may be less reason here, as the user can locomote to different locations, and thus there may be less of a need to recreate the view from arbitrary locations. | Controller/joystick<br>Actually walking traversing a distance, and detecting traversal (e.g., in a large room, room scale VR, and so on.) | Continuous movement, but generally not teleportation.<br>AR glass (in the case where the AR glass is fitted to the robot camera)<br>Cameras to detect and translate movement<br>Accelerometers, e.g., pedometer, to detect and translate movement<br>GPS, to detect and translate movement |
| | | | Actually walking, but not traversing a physical distance, and detecting an amount of distance that would have been traversed | Accelerometers, e.g., pedometer<br>Multi-directional treadmill with sensors indicating effective distance traveled.<br>Cameras or sensors to measure walking-in-place with gait analysis and thus effective distance travelled |

What is claimed is:

1. A method of operating an augmented reality experience, comprising:
   operating a server to receive data about a maze from a first user computing environment as a first user traverses the maze, the first user computing environment coupled to a first augmented reality display, and wherein the received data is data indicating a layout of the maze;
   operating the server to process the received data to determine locations of one or more action pockets or instantiation points in the maze;
   operating the server to communicate with an actor computing environment, the actor computing environment coupled to an actor display, the actor computing environment configured to generate an actor interface, the actor interface providing a link wherein an actor activating the link may access and control an actor avatar situated or instantiated in the action pocket or instantiation point within the maze, wherein the actor interface further displays one or more entries associated with users or user game objects, and wherein an entry is displayed on the actor interface based on the first user or a user game object associated with the first user, and first user computing environment, and first augmented reality display, entering the maze or interacting with a particular trigger within the maze, wherein the particular trigger is associated with a trigger area or trigger volume defined in the maze, and wherein the interacting with the particular trigger includes the first user or user game object intersecting with the trigger area or trigger volume;
   operating the server to display an inverted view on the actor display, the inverted view providing a simulated view for the actor in a direction from the action pocket or instantiation point at least partially towards the first user or user game object, the inverted view based on the received data about the maze, a location of the first user, and the location of the action pocket or instantiation point within the maze; and
   capturing actions of the actor using the actor computing environment, and operating the server to display a representation of the captured actions on the first augmented reality display such that movements of the actor are rendered on the first augmented reality display as movements of the actor avatar, whereby the actor avatar appears to a user to be acting within the maze.

2. The method of claim 1, wherein the received data is video data, LIDAR data, depth data, or architectural data.

3. The method of claim 1, wherein the actor display is rendered on an virtual or augmented reality display.

4. The method of claim 1, wherein the actor interface is rendered on a computer monitor or on a virtual or augmented reality display.

5. The method of claim 1, wherein the data about the maze is received from a camera associated with the first augmented reality display.

6. The method of claim 1, wherein the first augmented reality display is selected from the group consisting of: augmented reality glasses or headset, or a tablet or smart phone display.

7. The method of claim 1, wherein the maze is a common environment, and further comprising operating the server to communicate with a second user computing environment, the second user computing environment coupled to a second augmented reality display, the second user computing environment configured to generate a respective view of the actor avatar within the maze, the respective view being a view from a point of view of the second augmented reality display.

8. The method of claim 1, wherein the actor computing environment includes a virtual or augmented reality headset associated with the actor, the virtual or augmented reality headset including a respective virtual or augmented reality display, the actor display rendered on the respective virtual or augmented reality display, the actor computing environment further including one or more handheld controllers enabling actor interaction with the actor interface, the actor computing environment further comprising an input for visualization and depiction of actor hands, wherein data for the input for visualization and depiction of actor hands is generated in part by the one or more handheld controllers or by a camera imaging the actor hands, and wherein the inverted view is displayed on the virtual or augmented reality display associated with the actor.

9. The method of claim 8, wherein the camera is external or is situated on the virtual or augmented reality headset associated with the actor.

10. The method of claim 1, further comprising operating the server to provide an actor view of the maze to the actor interface from a point of view of the action pocket or instantiation point, wherein the actor view is the inverted view and is generated using data from a light field camera.

11. The method of claim 1, wherein the captured actions include one or more actor vocalizations.

12. The method of claim 11, further comprising modulating the one or more actor vocalizations.

13. The method of claim 1, wherein the display of the one or more entries includes sorting the one or more entries according to a characteristic time associated with each entry.

14. The method of claim 13, wherein the characteristic time is associated with a time duration between a time at which the user or user game object interacts with the respective particular trigger and a time at which the user or user game object is expected to reach a location associated with the action pocket or instantiation point within the maze.

15. The method of claim 1, further comprising operating the server to render one or more additional computer generated objects on the first augmented reality display, the additional computer generated objects providing an adornment or dressing to one or more walls, doors, windows, rooms, or hallways within the maze.

16. The method of claim 1, wherein the first user computing environment is integrated in the first augmented reality display.

17. The method of claim 1, wherein the actor interface also includes one or more action buttons, the one or more action buttons linking to potential actions performed by the actor avatar upon activation of the respective button.

18. The method of claim 1, further comprising operating the server to receive one or more user settings from the first user computing environment, and wherein the received one or more user settings are used to control at least in part an appearance of the actor avatar or of the maze.

19. The method of claim 1, wherein the operating the server to process the received data includes determining using object recognition locations of one or more doors, windows, mirrors, or cabinets.

20. The method of claim 1, wherein the server is a server of a social networking site, and further comprising operating the server to allow the first user computing environment to stream a view from the first augmented reality display to viewers on the social networking site.

21. The method of claim 1, further comprising using machine learning based on data about captured actions and captured user reactions in response to the captured actions to at least in part render a display on the actor interface an indicator of a suggested future actor action.

22. A non-transitory computer-readable medium, comprising instructions for causing a computing environment to perform the method of claim 1.

23. A method of operating an augmented reality experience, comprising:
operating a server to receive data about a maze, and wherein the received data is data indicating a layout of the maze, and operating the server to communicate with an actor computing environment, the actor computing environment coupled to an actor display, the actor computing environment configured to generate an actor interface, the actor interface providing a link wherein an actor activating the link may access and control an actor avatar situated or instantiated in the action pocket or instantiation point within the maze,
wherein the actor interface further displays one or more entries associated with one or more users or user game objects, and wherein an entry is displayed on the actor interface based on the first user or a user game object associated with the first user and first user computing environment and first augmented reality display entering the maze or interacting with a particular trigger within the maze, wherein the particular trigger is associated with a trigger area or trigger volume defined in the maze, and wherein the interacting with the particular trigger includes the first user or user game object intersecting with the trigger area or trigger volume;
operating the server to display an inverted view on the actor display, the inverted view providing a simulated view for the actor in a direction from the action pocket or instantiation point at least partially towards the first user or user game object, the inverted view based on the received data about the maze, a location of the first user, and the location of the action pocket or instantiation point within the maze; and
capturing actions of the actor using the actor computing environment, and operating the server to display a representation of the captured actions on the first augmented reality display such that movements of the actor are rendered on the first augmented reality display as movements of the actor avatar, whereby the actor avatar appears to a user to be acting within the maze.

24. The method of claim 1, wherein the received data is from a first user computing environment, the received data initially compiled as a first user traverses the maze and wherein the first user computing environment is coupled to a first source of visual data, or wherein the received data is from a data file indicating a layout of the locale.

25. A non-transitory computer-readable medium, comprising instructions for causing a computing environment to perform the method of claim 23.

26. An augmented reality headset coupled to a computing environment, the computing environment including a non-transitory computer readable medium, comprising instructions for causing the computing environment to perform a method comprising:
transmitting data about a maze to a server from a first user computing environment as a first user traverses the maze, the first user computing environment coupled to a first augmented reality display, and wherein the transmitted data is data indicating a layout of the maze, such that the server processes the received data to determine locations of one or more action pockets or instantiation points in the maze;

such that the server is operated to communicate with an actor computing environment, the actor computing environment coupled to an actor display, the actor computing environment configured to generate an actor interface, the actor interface providing a link wherein an actor activating the link may access and control an actor avatar situated or instantiated in the action pocket or instantiation point within the maze, wherein the actor interface further displays one or more entries associated with users or user game objects, and wherein an entry is displayed on the actor interface based on the first user or a user game object associated with the first user, and first user computing environment, and first augmented reality display, entering the maze or interacting with a particular trigger within the maze, wherein the particular trigger is associated with a trigger area or trigger volume defined in the maze, and wherein the interacting with the particular trigger includes the first user or user game object intersecting with the trigger area or trigger volume;

and such that the server is operated to display an inverted view on the actor display, the inverted view providing a simulated view for the actor in a direction from the action pocket or instantiation point at least partially towards the first user or user game object, the inverted view based on the received data about the maze, a location of the first user, and the location of the action pocket or instantiation point within the maze;

and such that the server is operated to capture actions of the actor using the actor computing environment, and displaying a representation of the captured actions on the first augmented reality display such that movements of the actor are rendered on the first augmented reality display as movements of the actor avatar, whereby the actor avatar appears to a user to be acting within the maze.

27. A method of operating an augmented reality experience, comprising:

operating a server to receive data about a maze from a first user computing environment, the data about the maze associated with a user desired locale, and wherein the received data is video data or layout data;

operating the server to process the received data to determine locations of one or more action pockets or instantiation points in the maze;

operating the server to communicate with the first user computing environment, the first user computing environment coupled to a first augmented reality display; and operating the server to communicate with an actor computing environment, the actor computing environment providing at least one artificial intelligence controlled actor with an associated actor avatar, the artificial intelligence controlled actor using machine learning based on data about actor avatar actions and captured user reactions in response to the actor avatar actions to at least in part suggest a future actor action calculated to deliver a desired user response, the actor avatar situated or instantiated in an action pocket or instantiation point within the maze, the actor avatar controlled to perform an action based in part on a user or user game object associated with the first user computing environment interacting with a respective particular trigger within the maze, wherein the particular trigger is associated with a trigger area or trigger volume defined in the maze, and wherein the interacting with a respective particular trigger includes intersecting with the trigger area or trigger volume, and operating the server to render movements of the artificial intelligence actor avatar on the first augmented reality display, whereby the actor avatar appears to a user to be acting within the maze.

* * * * *